United States Patent
Cintra et al.

(10) Patent No.: US 9,971,703 B2
(45) Date of Patent: May 15, 2018

(54) TECHNOLOGIES FOR POSITION-INDEPENDENT PERSISTENT MEMORY POINTERS

(71) Applicant: Intel Corporation, Santa Clara, CA (US)

(72) Inventors: Marcelo S. Cintra, Milpitas, CA (US); Cheng Wang, San Ramon, CA (US); Youfeng Wu, Palo Alto, CA (US); Alexandre Xavier DuChateau, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days. days.

(21) Appl. No.: 15/672,425

(22) Filed: Aug. 9, 2017

(65) Prior Publication Data

US 2017/0337137 A1 Nov. 23, 2017

Related U.S. Application Data

(63) Continuation of application No. 14/751,454, filed on Jun. 26, 2015, now Pat. No. 9,767,037.

(51) Int. Cl.
*G06F 12/1009* (2016.01)
*G06F 12/02* (2006.01)

(52) U.S. Cl.
CPC ...... *G06F 12/1009* (2013.01); *G06F 12/0238* (2013.01); *G06F 2212/1044* (2013.01)

(58) Field of Classification Search
CPC ............. G06F 12/1009; G06F 12/0238; G06F 2212/1044
See application file for complete search history.

(56) References Cited

U.S. PATENT DOCUMENTS

| | | | | |
|---|---|---|---|---|
| 6,671,791 | B1 * | 12/2003 | McGrath | G06F 12/1009 711/206 |
| 2011/0145476 | A1 * | 6/2011 | Hulbert | G06F 9/5016 711/103 |
| 2014/0195480 | A1 * | 7/2014 | Talagala | G06F 12/0804 707/610 |
| 2015/0169226 | A1 * | 6/2015 | Shen | G06F 12/0238 711/103 |

* cited by examiner

*Primary Examiner* — Michael Alsip
(74) *Attorney, Agent, or Firm* — Barnes & Thornburg LLP

(57) ABSTRACT

Technologies for persistent memory pointer access include a computing device having a persistent memory including one or more nonvolatile regions. The computing device may load a persistent memory pointer having a static region identifier, a segment identifier, and an offset from the persistent memory. The computing device may map the static region identifier to a dynamic region identifier and determine a virtual memory address of the persistent memory pointer target based on the dynamic region identifier, the segment identifier, and the offset. The computing device may load an in-storage representation of a persistent-export pointer from the persistent memory, map the in-storage representation to a runtime representation, and determine a target address of a persistent external data object based on the runtime representation. The computing device may include a compiler to generate output code including persistent memory pointer and/or persistent-export pointer accesses. Other embodiments are described and claimed.

20 Claims, 10 Drawing Sheets

TECHNOLOGIES FOR POSITION-INDEPENDENT PERSISTENT MEMORY POINTERS

CROSS-REFERENCE TO RELATED APPLICATION

The present application is a continuation application of U.S. application Ser. No. 14/751,454, entitled "TECHNOLOGIES FOR POSITION-INDEPENDENT PERSISTENT MEMORY POINTERS," which was filed on Jun. 26, 2015.

BACKGROUND

Typical computing systems include volatile memory such as random-access memory (RAM) coupled to persistent data storage such as hard disk drives or solid-state drives. Volatile memory requires a power source for operation; the contents of volatile memory may be lost when the power supply to a computing system is turned off. Persistent, or nonvolatile, storage retains its contents while power to the computing system is turned off.

Some computing systems include persistent memory, which may be byte-addressable, high-performance, non-volatile memory. Persistent memory may provide performance comparable to traditional volatile random access memory (RAM) while also providing data persistence. Computing systems may use persistent memory for program execution.

Executable code may be "position independent," meaning that the code may execute properly when mapped to different virtual address ranges. The virtual address range assigned to an executable may be determined at compile time, at runtime, or in a combination of compile time and runtime. For example, a shared library may be mapped to a different virtual address range when linked to an executable. As another example, application-global data such as externally accessible functions and global data may be mapped to different virtual addresses based on changes to application source code. In some computing devices, executable code may be mapped to a different, sometimes random, virtual address range on every execution. For example, address space layout randomization (ASLR) is a computer security technique that may provide protection against buffer overflow attacks. Operating systems such as OS X, Linux, and Android 4.0 provide ASLR to help protect system and third party applications from exploits due to memory-management issues.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
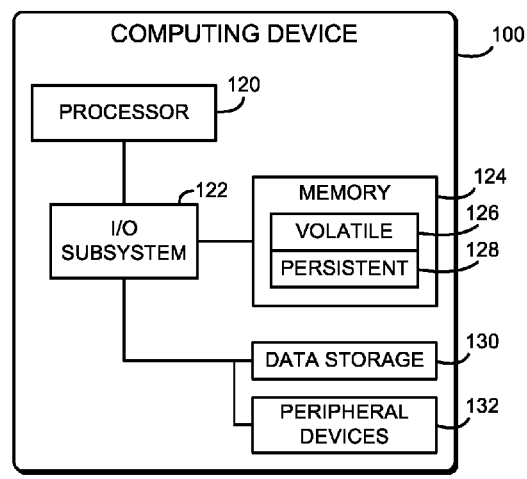
FIG. 1 is a simplified block diagram of at least one embodiment of a computing device for persistent memory pointer access.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C): (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or nonvolatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in one embodiment, a computing device 100 for persistent memory pointer access includes both volatile and persistent memory that may be used to execute programs. In use, as discussed in more detail below, the computing device 100 may open one or more regions of persistent memory (NVRegions). Each NVRegion includes metadata and one or more data segments. Each NVRegion is mapped into a block of virtual memory space established by the computing device 100. However, the location of the NVRegion in the virtual memory space may change every time the NVRegion is loaded. For example, in some embodiments the computing device 100 may randomize the location of the NVRegion in virtual memory, and in some embodiments same NVRegion may be loaded simultaneously by more than one process at different locations in the virtual memory space. Each NVRegion may include persistent memory pointers that target data that is also stored in the persistent memory. The computing device 100 may access the persistent memory pointers (e.g., dereference, assign, and perform other pointer operations) in a position-independent manner as described further below. The computing device 100 allows persistent memory pointers and associated data structures to be efficiently stored in persistent memory without requiring data serialization and/or deserialization. Similarly, each NVRegion may include persistent-export pointers that target process-global data in the volatile memory such as functions or global data. The computing device 100 may similarly randomize or otherwise map the application-global data to different locations in the virtual memory. The computing device 100 may access the persistent-export pointers (e.g., dereference, assign, and perform other pointer operations) in a position-independent manner as described further below. The computing device 100 allows function pointers and application-global data pointers to be stored in persistent memory and used efficiently across program invocations, even if the program source changes or if the application-global data moves to different locations in virtual memory.

The computing device 100 may be embodied as any type of computing device capable of performing the functions described herein, including, without limitation, a computer, a multiprocessor system, a server, a rack-mounted server, a blade server, a laptop computer, a notebook computer, a tablet computer, a smartphone, a mobile computing device, a wearable computing device, a network appliance, a web appliance, a distributed computing system, a processor-based system, and/or a consumer electronic device. As shown in FIG. 1, the computing device 100 includes a processor 120, an input/output subsystem 122, a memory 124, and a data storage device 130. Of course, the computing device 100 may include other or additional components, such as those commonly found in a computer (e.g., various input/output devices), in other embodiments. Additionally, in some embodiments, one or more of the illustrative components may be incorporated in, or otherwise form a portion of, another component. For example, the memory 124, or portions thereof, may be incorporated in one or more processor 120 in some embodiments.

The processor 120 may be embodied as any type of processor capable of performing the functions described herein. For example, the processor may be embodied as a single or multi-core processor(s), digital signal processor, microcontroller, or other processor or processing/controlling circuit. Similarly, the memory 124 may be embodied as any type of volatile or nonvolatile memory or data storage capable of performing the functions described herein. In operation, the memory 124 may store various data and software used during operation of the computing device 100 such as operating systems, applications, programs, libraries, and drivers.

The memory 124 further includes volatile memory 126 and persistent memory 128. The volatile memory 126 may be embodied as traditional RAM, meaning that any data contained in the volatile memory 126 is lost when power is removed from the computing device 100 and/or the volatile memory 126. The persistent memory 128 may be embodied as any byte-addressable, high-performance, nonvolatile memory. For example, the persistent memory 128 may be embodied as battery-backed RAM, phase-change memory, spin-transfer torque RAM, resistive RAM, memristor-based memory, or other types of persistent memory. The persistent memory 128 may include programs and data similar to the volatile memory 126; however, the contents of the persistent memory 128 are retained for at least some period of time when power is removed from the computing device 100 and/or the persistent memory 128. In some embodiments, the memory 124 may include only persistent memory 128; however, in those embodiments a portion of the persistent memory 128 may be used to store volatile data similar to volatile memory 126.

The memory 124 is communicatively coupled to the processor 120 via the I/O subsystem 122, which may be embodied as circuitry and/or components to facilitate input/output operations with the processor 120, the memory 124, and other components of the computing device 100. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the computing device 100, on a single integrated circuit chip.

The data storage device 130 may be embodied as any type of device or devices configured for short-term or long-term storage of data such as, for example, memory devices and circuits, memory cards, hard disk drives, solid-state drives, or other data storage devices. Access to the data storage device 130 may be much slower than to the persistent memory 128. Additionally, the data storage device 130 may be accessed through a block device, file system, or other non-byte-addressable interface.

In some embodiments, the computing device 100 may also include one or more peripheral devices 132. The peripheral devices 132 may include any number of additional input/output devices, interface devices, and/or other peripheral devices. For example, in some embodiments, the peripheral devices 132 may include a display, touch screen, graphics circuitry, keyboard, mouse, speaker system, network interface, and/or other input/output devices, interface devices, and/or peripheral devices.

Figure 2:
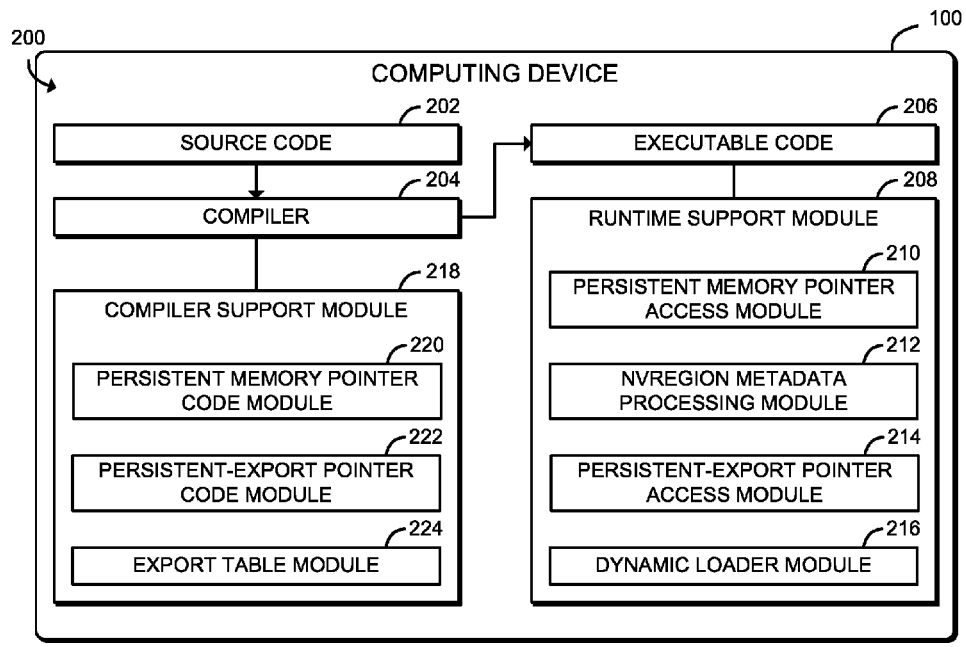
FIG. 2 is a simplified block diagram of at least one embodiment of an environment of the computing device of FIG. 1.

Referring now to FIG. 2, in an illustrative embodiment, the computing device 100 establishes an environment 200 during operation. The illustrative environment 200 includes source code 202, a compiler 204, executable code 206, a runtime support module 208, and a compiler support module 218. The various modules of the environment 200 may be embodied as hardware, firmware, software, or a combination thereof. For example, one or more of the modules, logic, and other components of the environment 200 may form a portion of, or otherwise be established or executed by, the processor 120 or other hardware components of the computing device 100. As such, in some embodiments, any one or more of the modules of the environment 200 may be embodied as a circuit or collection of electrical devices (e.g., a compiler support circuit, a runtime support circuit, etc.).

The source code 202 includes symbols that may be translated into machine-executable code. The source code 202 may include typical source code features such as executable statements, control flow statements, data structures, and the like. Additionally, the source code 202 may include one or more commands, directives, or other requests to manipulate data stored in the persistent memory 128. For example, the source code 202 may include one or more persistent memory pointer accesses (e.g., assigning or dereferencing a persistent pointer), one or more persistent-export pointer accesses, or other operations on data stored in the persistent memory 128. The source code 202 may be embodied as C or C++ code, FORTRAN code, Java code, C# code, Objective C code, bytecode, assembly code, or any other computer code accepted by the compiler 204.

The compiler 204 is configured to process the source code 202 and produce the executable code 206. The compiler 204 may process the source code 202 in stages, for example, first parsing the source code 202 to build an intermediate representation of the source code 202, then optimizing the intermediate representation of the source code 202, and last generating executable code 206 based on the intermediate representation. The compiler 204 may detect the manipulation of data stored in the persistent memory 128 and generate appropriate output code using the compiler support module 218.

The executable code 206 includes machine-executable code generated by the compiler 204 based on the source code 202. The executable code 206 may include one or more function calls, code segments, subroutines, or other operations that manipulate data stored in the persistent memory 128. To manipulate the persistent memory 128, the executable code 206 may reference, call, incorporate, or otherwise use the runtime support module 208. The executable code 206 may be embodied as binary code directly executable on a computing device, binary object code that may be linked with other code to produce an executable, precompiled header files that may be incorporated into an executable, or any other output file typically produced by a compiler. In some embodiments, the executable code 206 may include bytecode targeted to a virtual machine, and the bytecode may be interpreted by a computing device or "just-in-time" compiled for execution by a computing device. The executable code 206 may be targeted to a particular computer instruction set or otherwise targeted to the architecture of a particular computing device. In some embodiments, the executable code 206 may be executable by the computing device 100 itself. In other embodiments, the executable code 206 may be executable by a target computing device other than the computing device 100 (not shown). In such embodiments, the compiler 204 may be a so-called "cross compiler."

The runtime support module 208 is configured to provide runtime support routines to allow the executable code 206 to manipulate data in the persistent memory 128. The runtime support module 208 may include sub-modules to perform those tasks, including a persistent memory pointer access module 210, an NVRegion metadata processing module 212, a persistent-export pointer access module 214, and/or a dynamic loader module 216. In some embodiments, all or part of the runtime support module 208 may be incorporated in the executable code 206.

The persistent memory pointer access module 210 is configured to load a persistent memory pointer from a source NVRegion in the persistent memory 128. The persistent memory pointer may reference a target data object in another NVRegion; that is, a target address of the persistent memory pointer may be included in a different, target NVRegion. The persistent memory pointer includes a static region identifier associated with the target NVRegion, a segment identifier, and an offset. The persistent memory pointer access module 210 is further configured to index a static-to-dynamic table associated with the source NVRegion using the static region identifier to retrieve a dynamic region identifier associated with the target NVRegion. The persistent memory pointer access module 210 is further configured to index an open region table with the dynamic region identifier to retrieve a virtual base address of a region segment table associated with the target NVRegion. The static-to-dynamic table, the open region table, and the region segment table are included in the volatile memory 126. The persistent memory pointer access module 210 is further configured to index the region segment table with the segment identifier to retrieve a virtual base address of a persistent memory segment of the second nonvolatile region and add that virtual base address to the offset to determine the target address of the persistent memory pointer. The persistent memory pointer access module 210 may be further configured to dereference the target address to access the target data object in the persistent memory 128. In some embodiments, the persistent memory pointer access module 210 may be configured to generate a runtime representation of the persistent memory pointer, which includes the dynamic region identifier, the segment identifier, and the offset. The persistent memory pointer access module 210 may be further configured to index a dynamic-to-static table with the dynamic region identifier to retrieve the static region identifier, generate an in-storage representation of the persistent memory pointer including the static region identifier, the segment identifier, and the offset, and store the in-storage representation to the persistent memory 128. Similar to the static-to-dynamic table, the dynamic-to-static table is associated with the source NVRegion and included in the volatile memory 126.

The NVRegion metadata processing module 212 is configured to read a static region identifier table associated with the source NVRegion and update various data tables stored in the volatile memory 126 accordingly. The static region identifier table is included in the persistent memory 128, and each entry includes a region name associated with the target NVRegion of at least one persistent-memory pointer included in the source NVRegion. The index of each entry in the static region identifier table is the static region identifier associated with the corresponding target NVRegion. The NVRegion metadata processing module 212 is further configured to search the open region table for an entry matching the name of the target NVRegion. The index of each entry in the open region table is the dynamic region identifier of the corresponding NVRegion. The NVRegion metadata processing module 212 is configured to determine whether the target NVRegion has already been opened based on searching the open region table and to open the target NVRegion and update the open region table if not already open. The NVRegion metadata processing module 212 is further configured to index the static-to-dynamic table with the static region identifier and store the associated dynamic region identifier at the corresponding entry. The NVRegion metadata processing module 212 is further configured to read a segment table associated with each NVRegion, map the persistent memory segments of the NVRegion to a virtual memory space of the computing device 100, and store the virtual base addresses of the persistent memory segments to a region segment table associated with the NVRegion and stored in the volatile memory 126. The NVRegion metadata processing module 212 is further configured to store the virtual base address of the region segment table into the open region table.

The NVRegion metadata processing module 212 is further configured to update the static region identifier associated with the source NVRegion and various data tables in the volatile memory 126 in response to persistent memory pointer assignments. The NVRegion metadata processing module 212 is configured to determine whether the static region identifier table includes an entry associated with the target NVRegion in response to an assignment to a persistent memory pointer and add an entry to the static region identifier table if the static region identifier table does not include an entry associated with the target NVRegion. The NVRegion metadata processing module 212 is further configured to update the dynamic-to-static table and the static-to-dynamic table based on the new entry to the static region identifier table.

The persistent-export pointer access module 214 is configured to load an in-storage representation of a persistent-export pointer from a source NVRegion in the persistent memory 128. The persistent-export pointer references a persistent-external data object stored in the volatile memory 126; that is, a target address of the persistent-export pointer is within the volatile memory 126 and is associated with a persistent-external data object such as a function or application global data. The persistent-export pointer access module 214 is further configured to index a region-external linkable mapping table with the in-storage representation of the persistent-export pointer to retrieve a runtime representation of the persistent-export pointer. The region-external linkable mapping table is associated with the source NVRegion and is included in the volatile memory 126. The persistent-export pointer access module 214 is further configured to index an executable external linkable table with the runtime representation to retrieve the target address associated with the persistent-external data object. The executable external linkable table is associated with an executable process of the computing device 100 and is included in the volatile memory 126. The persistent-export pointer access module 214 may be further configured to dereference the target address to access the persistent-external data object, for example by calling the referenced function. The persistent-export pointer access module 214 may be configured to index the executable external linkable mapping table with the runtime representation to retrieve an in-storage representation of the persistent-export pointer and store the in-storage representation of the persistent-export pointer to the persistent memory 128. Similar to the region-external linkable mapping table, the executable external linkable mapping table is associated with the source NVRegion and is included in the volatile memory 126.

The dynamic loader module 216 is configured to load an executable process of the computing device 100 and map the persistent-external data objects of the process to a virtual memory space of the computing device 100. The dynamic loader module 216 is further configured to update the executable external linkable table with the virtual memory addresses of the persistent-external data objects after mapping.

In some embodiments, the NVRegion metadata processing module 212 may be configured to read a region-external linkable table associated with the source NVRegion and update various data tables stored in the volatile memory 126 accordingly. The region-external linkable table is included in the persistent memory 128, and each entry includes a global identifier associated with the target persistent-external data object of at least one persistent-export pointer in the source NVRegion. The index of each entry in the region-external linkable table is the in-storage representation of corresponding the persistent-export pointer. The NVRegion metadata processing module 212 is further configured to search the executable external linkable table for an entry matching the global identifier of a corresponding persistent-external data object. The index of the entry in the executable external linkable table is the runtime representation of the persistent-export pointer. The NVRegion metadata processing module 212 is further configured to update the region-external linkable mapping table by indexing the region-external linkable mapping table with the in-storage representation of the persistent-export pointer and storing the runtime representation.

The NVRegion metadata processing module 212 may be further configured to update the region-external linkable table associated with the source NVRegion and various data tables in the volatile memory 126 in response to persistent-export pointer assignments. The NVRegion metadata processing module 212 may be configured to determine whether the region external linkable table associated with the source NVRegion includes an entry associated with the target persistent-external data object in response to a persistent-export pointer assignment and add an entry to the region external linkable table if the region external linkable table does not include an entry associated with the target persistent-external data object. The NVRegion metadata processing module 212 is further configured to update the region external linkable mapping table and the executable external linkable mapping table based on the new entry to the region external linkable table.

The compiler support module 218 is configured to allow the compiler 204 to interpret commands in the source code 202 relating to manipulation of data in the persistent memory 128 and to generate appropriate output code for those commands. The compiler support module 218 may include sub-modules to perform those tasks, including a persistent memory pointer code module 220, a persistent-export pointer code module 222, and/or an export table module 224. In some embodiments, all or part of the compiler support module 218 may be incorporated in the compiler 204.

The persistent memory pointer code module 220 is configured to generate, in response to analyzing the source code 202, output code for one or more persistent memory pointer accesses. The output code is to cause a target computing device to access a persistent memory pointer using the techniques described above in connection with the persistent memory pointer access module 210 and/or the NVRegion metadata processing module 212. The persistent memory pointer code module 220 may, for example, generate output code to perform the operations of the persistent memory pointer access module 210 and/or the NVRegion metadata processing module 212, or in some embodiments the persistent memory pointer code module 220 may generate output code including function calls or other references to runtime resources to perform those operations.

Similarly, the persistent-export pointer code module 222 is configured to generate, in response to analyzing the source code 202, output code for one or more persistent-export pointer accesses. The output code is to cause a target computing device to access a persistent-export pointer using the techniques described above in connection with the persistent-export pointer access module 214, the dynamic loader module 216, and/or the NVRegion metadata processing module 212. The persistent-export pointer code module 222 may, for example, generate output code to perform the operations of the persistent-export pointer access module 214, the dynamic loader module 216, and/or the NVRegion metadata processing module 212, or in some embodiments the persistent-export pointer code module 222 may generate output code including function calls or other references to runtime resources to perform those operations.

The export table module 224 is configured to generate, in response to analyzing the source code 202 output code including a static executable external linkable table. The static executable external linkable table includes one or more entries associated with the persistent-external data objects defined in the source code 202. Each entry includes a global identifier associated with the persistent-external data object such as a function name or other identifier.

Figure 3A:
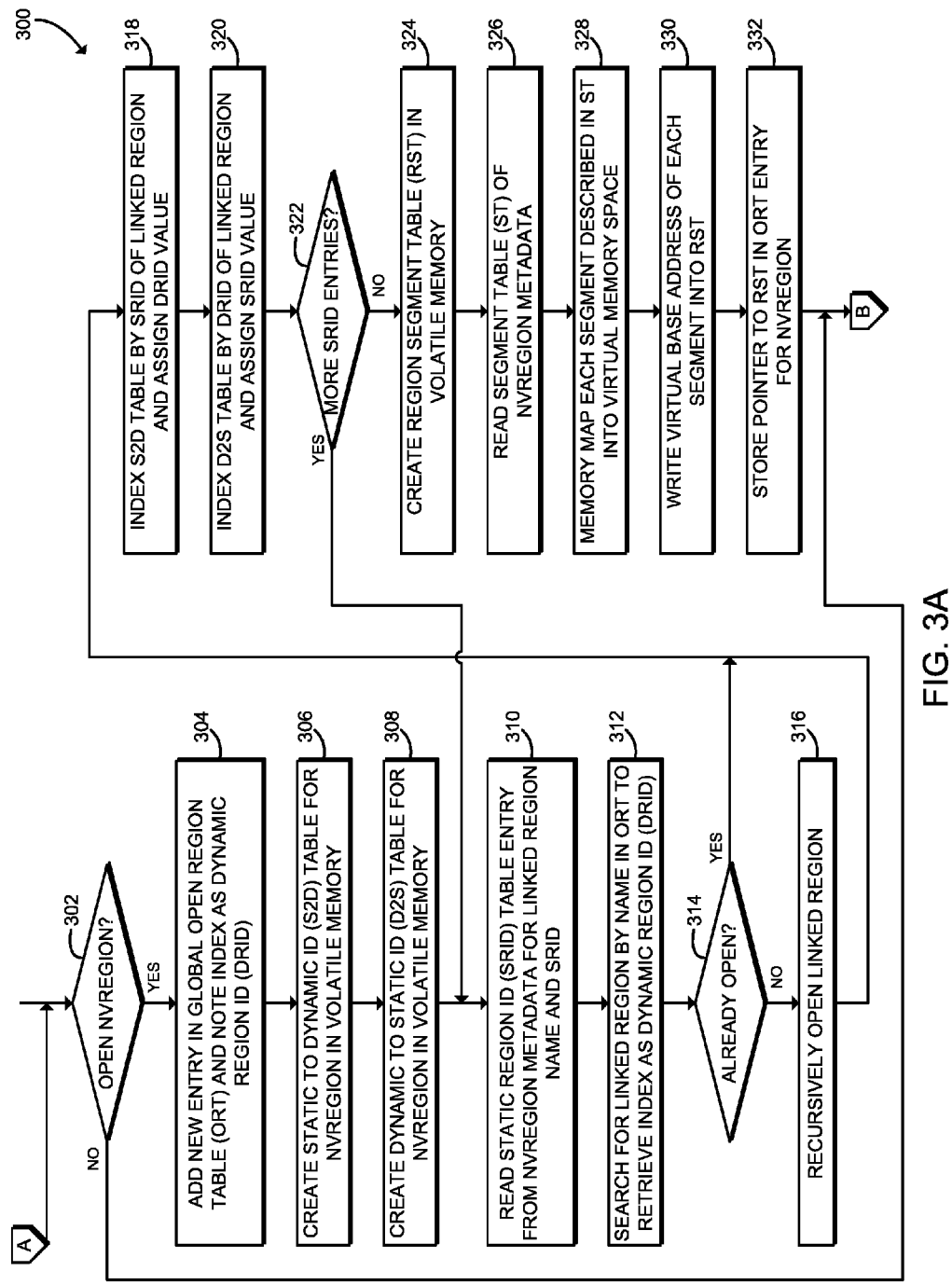
FIGS. 3A and 3B are a simplified flow diagram of at least one embodiment of a method for persistent memory pointer access that may be executed by the computing device of FIGS. 1 and 2.
Figure 3B:
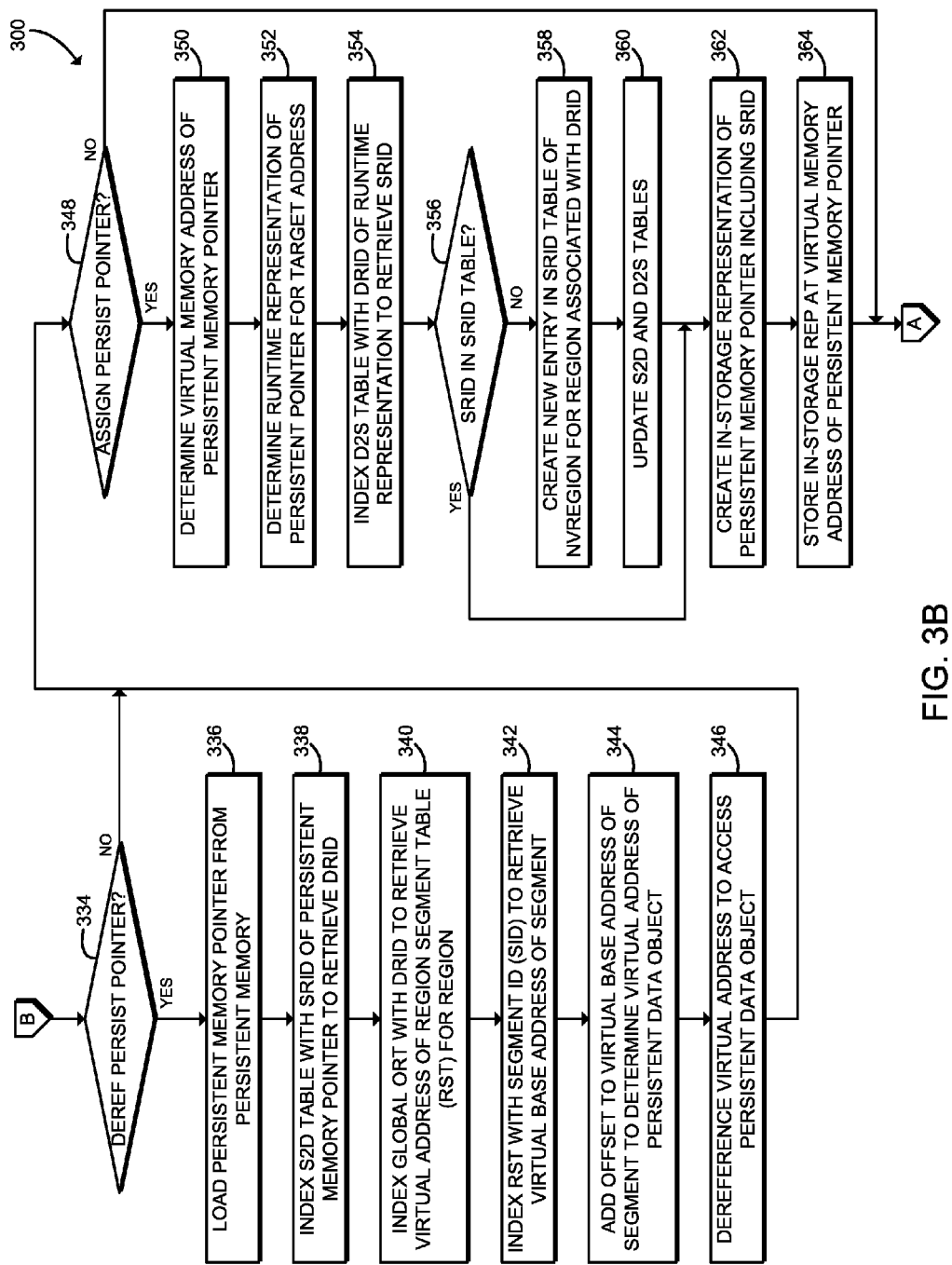

Referring now to FIGS. 3A and 3B, in use, the computing device 100 may execute a method 300 for persistent memory pointer access. The method 300 begins in block 302, in which the computing device 100 determines whether to open a nonvolatile memory region. The persistent memory 128 may be subdivided into one or more regions known as nonvolatile regions or "NVRegions." Each of the NVRegions includes metadata and one or more segments including persistent data. Each segment is a contiguous section of virtual memory. The segments may have different sizes and, after the NVRegion is opened, may be mapped in different parts of the virtual memory space of the computing device 100. Additionally, segment may be mapped to different locations in the virtual memory space each time the NVRegion is opened. The computing device 100 may use any technique for determining whether to open the NVRegion. For example, the computing device 100 may open the NVRegion in response to an application programming interface (API) call, system call, or other command generated by a running process. The NVRegion may already exist in the persistent memory 128, or the computing device 100 may create a new NVRegion. If the computing device 100 determines not to open an NVRegion (e.g., during execution of a process after one or more NVRegions have already been opened), the method 300 branches ahead to block 334, shown in FIG. 3B. If the computing device 100 determines to open an NVRegion, the method 300 advances to block 304.

In block 304, the computing device 100 adds an entry corresponding to the new NVRegion into a global open region table. The computing device 100 maintains the open region table in the volatile memory 126, and the open region table stores information relating to all NVRegions opened by the current process or application. In particular, each entry in the open region table may include a name, path, text string, or other identifier associated with each open NVRegion. The global open region table may be addressable by an integral index, and the index of each entry in the NVRegion may be used as a dynamic region identifier (DRID) for the corresponding NVRegion, as described further below. After adding the new entry to the open region table, the computing device 100 notes the index of that new entry as the DRID of the corresponding NVRegion.

In block 306, the computing device 100 creates a static to dynamic identifier (S2D) table in the volatile memory 126 that is associated with the new NVRegion. Each entry in the S2D table includes a DRID, and the S2D table may be indexed by a static region identifier (SRID) as described further below. Similarly, in block 308, the computing device 100 creates a dynamic to static (D2S) table in the volatile memory 126 that is associated with the new NVRegion. Each entry in the D2S table includes an SRID, and the D2S table may be indexed by a DRID as described further below. Thus, the newly opened NVRegion is associated with both an S2D table and a D2S table stored in the volatile memory 126.

In block 310, the computing device 100 reads a static region ID (SRID) table entry from metadata associated with the newly opened NVRegion. The SRID table is stored within the persistent memory 128, for example as part of the NVRegion. The SRID table includes information to identify all other NVRegions referenced by persistent memory pointers from within the newly opened NVRegion. For example, each entry in the SRID table may include a name, path, text string, or other identifier associated with a linked NVRegion, and the index of each entry in the SRID table may be used as a static region identifier (SRID) for that NVRegion. Thus, because each NVRegion is associated with its own metadata including its own SRID table, different NVRegions may use different SRIDs to refer to the same linked NVRegion.

In block 312, the computing device 100 searches for the linked NVRegion by name in the open region table to determine the DRID for the linked NVRegion. Searching for the linked NVRegion determines whether the computing device 100 has already opened the linked NVRegion. As described above, the index of the entry in the open region table for the linked NVRegion corresponds to the DRID of the linked NVRegion. If the named region is not found in the open region table, the computing device 100 may return an invalid index (e.g., −1) or otherwise indicate that the linked NVRegion was not found.

In block 314, the computing device 100 determines whether the linked NVRegion is already open. If so, the method 300 branches ahead to block 318. If the linked NVRegion is not already open, the method 300 advances to block 316, in which the computing device 100 recursively opens the linked NVRegion. The computing device 100 may open the linked NVRegion and any additional NVRegions referenced by the linked NVRegion, and so on, for example by executing the method 300 for the linked NVRegion. After recursively opening the linked NVRegion, the method 300 proceeds to block 318.

In block 318, the computing device 100 indexes the static to dynamic (S2D) table with the SRID of the linked NVRegion and assigns the DRID value. In block 320, the computing device 100 indexes the dynamic to static (D2S) table with the DRID of the linked NVRegion and assigns the SRID value. As described above, the SRID corresponds to the index in the SRID table associated with the linked NVRegion, and the DRID corresponds to the index in the open region table associated with the linked NVRegion. Thus after assigning values to the S2D table and the D2S table, the computing device 100 may be capable of translating back and forth between SRID and DRID values for a given NVRegion.

In block 322, the computing device 100 determines whether the SRID table of the newly opened NVRegion includes additional entries. If so, the method 300 loops back to block 310 to process additional entries in the SRID table. If no additional SRID table entries exist, the method 300 advances to block 324.

In block 324, the computing device 100 creates a region segment table (RST) in the volatile memory 126. The RST is associated with the newly opened NVRegion. In block 326, the computing device 100 reads entries from a segment table (ST) stored in the metadata associated with the newly opened NVRegion. The segment table is stored within the persistent memory 128, for example as part of the NVRegion. The segment table includes information describing one or more memory segments within the NVRegion, such as segment offset, length, or other information. The index each entry in the segment table is used as a segment identifier (SID) for the corresponding segment, as described further below.

In block 328, the computing device 100 memory maps each segment of the newly opened NVRegion into a location in virtual memory space. After being mapped into virtual memory, each segment is associated with a virtual base address, corresponding to the virtual memory address at the start of the segment. The segments may be mapped into non-contiguous locations in the virtual memory space, and each segment may be mapped to a different virtual base address every time the NVRegion is opened. In block 330, the computing device 100 writes the virtual base address of each segment into the RST. For example, the computing device 100 may index the RST using the segment identifier of the corresponding segment and then write the virtual base address of the corresponding segment. In block 332, the computing device 100 stores a pointer to the RST into an entry in the open region table corresponding to the newly opened NVRegion. After mapping the regions and preparing the RST as described above, the NVRegion may be ready to be used for persistent memory pointer accesses, as described further below in connection with FIG. 3B.

Figure 4:
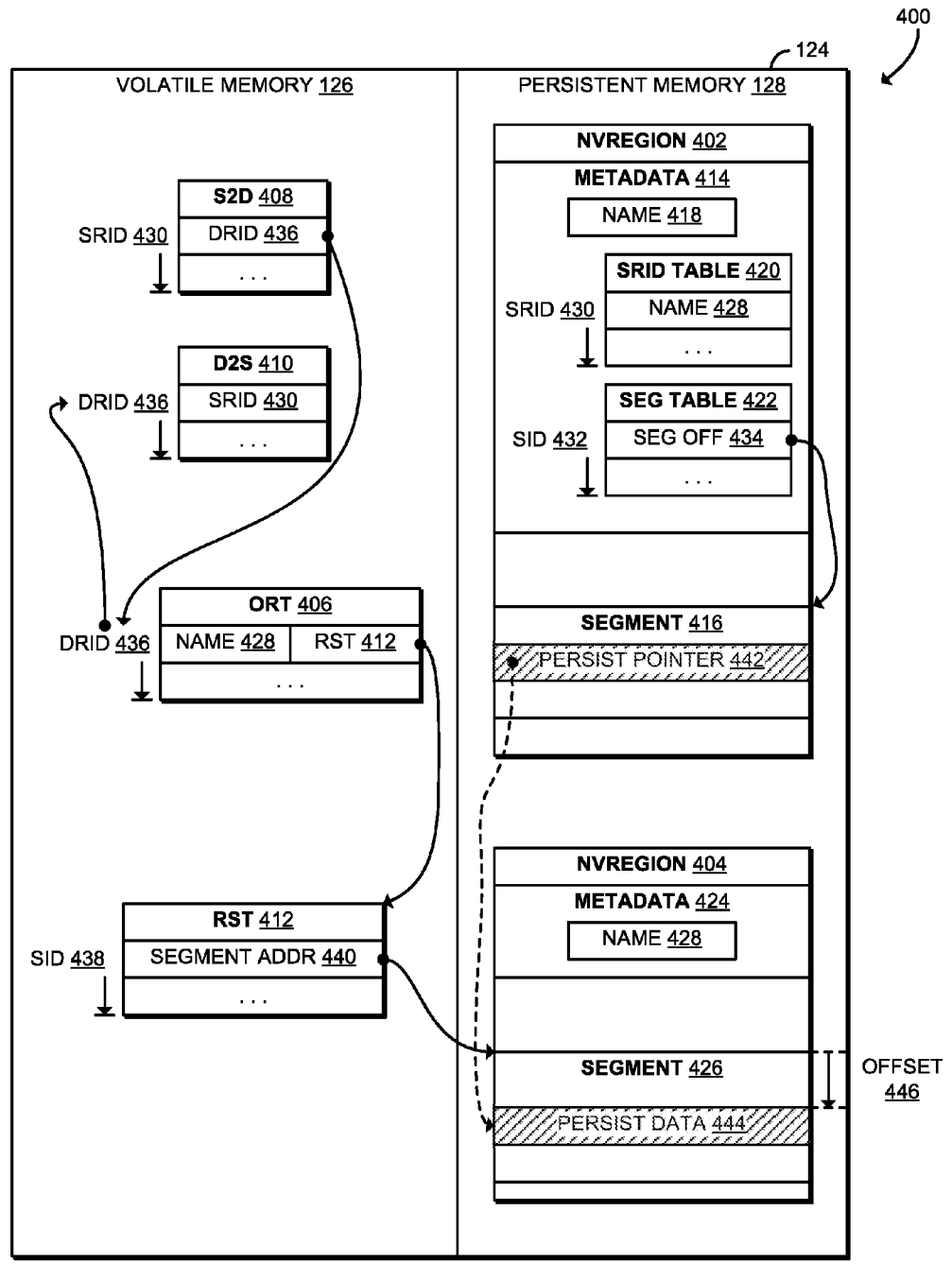
FIG. 4 is a schematic diagram illustrating memory structures that may be established by the computing device of FIGS. 1 and 2.

Referring now to FIG. 4, schematic diagram 400 illustrates the memory 124 of the computing device 100 after one or more NVRegions have been loaded as described above in connection with FIG. 3A. As shown, the persistent memory 128 includes two open NVRegions 402, 404, and the volatile memory 126 includes an open region table 406, a static-to-dynamic (S2D) table 408, a dynamic-to-static (D2S) table 410, and a region segment table (RST) 412. In the illustrative example, the S2D table 408 and the D2S table 410 are associated with the NVRegion 402, and the RST 412 is associated with the NVRegion 404. In use, the volatile memory 126 would include a similar RST for the NVRegion 402 and similar S2D and D2S tables for the NVRegion 404, which are omitted for clarity of the present disclosure.

The NVRegion 402 includes metadata 414 and a single segment 416. The metadata 414 includes a name 418, a static region identifier table 420, and a segment table 422. Similarly, the NVRegion 404 includes metadata 424 and a single segment 426. The metadata 424 of the NVRegion 404 includes a name 428, and may include an SRID table and segment table similar to the metadata 414, which are also omitted for clarity of the present disclosure.

Referring back to the metadata 414 of the NVRegion 402, the SRID table 420 includes entries for each NVRegion that is referenced by a persistent memory pointer within the NVRegion 402. Each entry may include information identifying a referenced NVRegion, such as the name of the NVRegion. The index of each entry in the SRID table 420 is the static region identifier (SRID) of the corresponding NVRegion. For example, as shown, an entry having an SRID 430 may include the name 428 corresponding to the NVRegion 404.

The segment table 422 includes entries for each segment 416 of the NVRegion 402. Each entry may include information identifying an associated segment, such as a segment offset, segment size, or other information. The index of each entry in the segment table 422 is the segment identifier (SID) of the corresponding segment. For example, as shown, an entry having a segment identifier 432 may include a segment offset 434 corresponding to the segment 416.

As described above, the open region table 406 stored in the volatile memory 126 includes entries associated with the open NVRegions 402, 404. Illustratively, the open region table 406 includes a name and a pointer to the RST associated with each open NVRegion. The index of each entry in the open region table 406 is the dynamic region identifier (DRID) of the associated NVRegion. For example, as shown, an entry having a DRID 436 corresponds to the NVRegion 404 and thus may include the name 428 and a pointer to the RST 412.

The S2D table 408 is indexed by the SRID of an NVRegion and includes entries with the DRID of the corresponding NVRegion. For example, as shown, an entry having the index SRID 430 includes the DRID 436 corresponding to the NVRegion 404. Similarly, the D2S table 410 is indexed by the DRID of an NVRegion and includes entries with the SRID of the corresponding NVRegion. For example, as shown, an entry having the index DRID 436 includes the SRID 430 corresponding to the NVRegion 404.

The RST 412 includes entries for each segment of the corresponding NVRegion. Each entry in the RST 412 includes the virtual base address of the corresponding segment. The index of each entry in the RST 412 is the segment identifier of the corresponding segment. The segment identifier of the RST 412 is the same segment identifier included in the metadata of the corresponding NVRegion. For example, as shown, the RST 412 includes an entry having the index SID 438 and including the virtual base address 440, which correspond to the segment 426 of the NVRegion 404.

Referring back to FIGS. 3A and 3B, after opening one or more NVRegions, the method 300 continues with block 334, shown in FIG. 3B. In block 334, the computing device 100 determines whether to dereference a persistent memory pointer. Dereferencing the persistent memory pointer allows the computing device 100 to find a virtual address of the target of the persistent memory pointer. The computing device 100 may dereference persistent memory pointers in response to high-level language programming constructs, API or system calls, low-level instructions generated by a compiler or assembler, or any other request to dereference a persistent memory pointer. Thus, the determination of whether to dereference the persistent memory pointer may be determined using compiler or language support as described below in connection with FIG. 8. If the computing device 100 determines not to dereference a persistent pointer, the method 300 branches ahead to block 348. If the computing device 100 determines to dereference the persistent pointer, the method 300 advances to block 336.

In block 336, the computing device 100 loads the persistent memory pointer from the persistent memory 128. The computing device 100 may load the persistent memory pointer, for example, using one or more processor instructions to load the persistent memory pointer into a register of the processor 120. The persistent memory pointer loaded from the persistent memory 128 is formatted in an "in-storage" representation that includes a static region identifier (SRID), segment identifier (SID), and offset of the target data object in the persistent memory 128. For example, in an illustrative embodiment the in-storage representation of the persistent memory pointer may be embodied as a binary value with the SRID and SID both embodied as 4-bit integers, and the offset embodied as a 48-bit integer.

In block 338, the computing device 100 indexes the static-to-dynamic (S2D) table with the SRID of the persistent memory pointer to retrieve the associated dynamic region identifier (DRID). The DRID is an identifier associated with the NVRegion including the target of the persistent memory pointer and is determined at runtime. The SRID is populated with DRID values as NVRegions are opened by the computing device 100. Thus, the DRID may be different from the SRID, and the DRID may vary between invocations of the method 300. The DRID may be embodied as a 4-bit integer, similar to the SRID. In some embodiments, the computing device 100 may generate a runtime representation of the persistent memory pointer that includes the DRID, the S1D, and the offset. For example, the computing device 100 may store the runtime representation in one or more registers of the processor 120.

In block 340, the computing device 100 indexes the global open region table (ORT) with the DRID to retrieve the virtual address of a region segment table (RST) associated with the NVRegion that includes the target of the persistent memory pointer. As described above, the ORT is populated with data as the NVRegions are opened by the computing device 100.

In block 342, the computing device 100 indexes the RST determined in block 340 with the segment identifier (SID) of the persistent memory pointer to determine the virtual base address of the associated segment. The computing device 100 may index the RST by, for example, adding the SID (or an appropriate multiple of the SID) to the virtual base address of the RST. As described above, the RST is populated with virtual base addresses as the segments of the NVRegion are mapped to virtual memory.

In block 344, the computing device 100 adds the offset from the persistent memory pointer to the virtual base address of the segment to determine the virtual address of the target of the persistent memory pointer. The virtual address thus points to the target data object of the persistent memory pointer, which is located within the persistent memory 128. The virtual address may be embodied as any virtual memory address, linear address, physical address, or other address that may be used by the computing device 100 to access the target data object. For example, the virtual address may be embodied as a 64-bit linear memory address. In block 346, the computing device 100 dereferences the virtual address to access the persistent data object. The computing device 100 may, for example execute one or more processor instructions to load the data from the virtual address into one or more registers of the processor 120.

Referring again to FIG. 4, the schematic diagram 400 includes a persistent memory pointer 442 located in the NVRegion 402 that references a persistent data object 444 located in the NVRegion 404. Thus, the in-storage representation of the illustrative persistent memory pointer 442 includes the static region identifier (SRID) 430 associated with the NVRegion 404, the segment identifier (SID) 438, and an offset 446. To dereference the persistent memory pointer 442, the computing device 100 may index the S2D table 408 with the SRID 430 to retrieve the DRID 436. Next, the computing device 100 may index the open region table (ORT) 406 with the DRID 436 to retrieve a pointer to the RST 412. After that, the computing device 100 may index the RST 412 with the index SID 438 to retrieve the virtual base address 440 of the segment 426. Last, the computing device 100 may add the offset 446 to the virtual base address 440 to determine the virtual address of the persistent data object 444.

Figure 5:
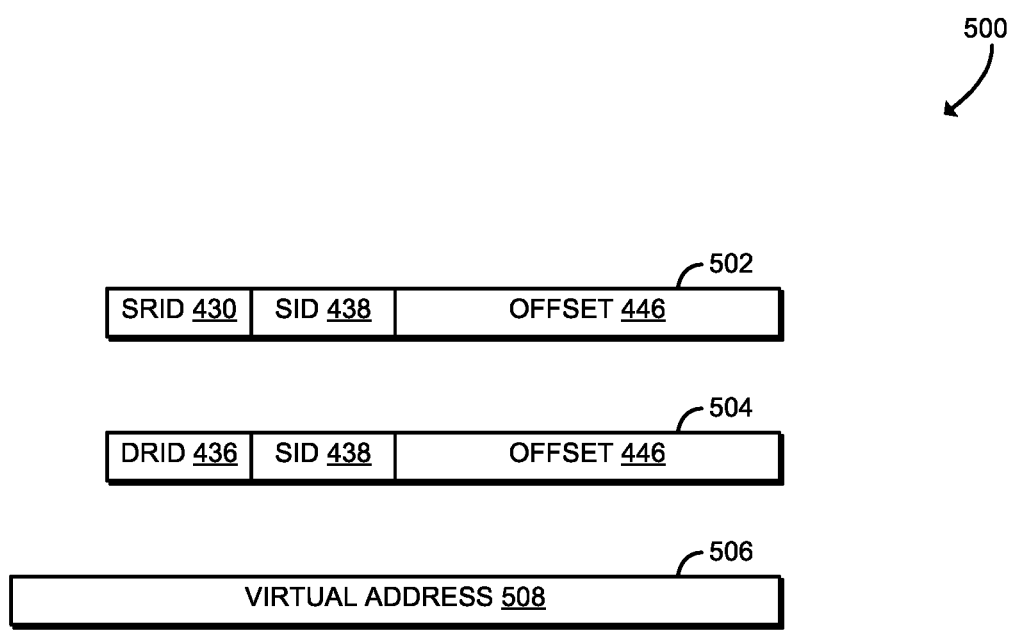
FIG. 5 is a schematic diagram illustrating persistent memory pointer representations that may be established by the computing device of FIGS. 1 and 2.

Referring now to FIG. 5, schematic diagram 500 illustrates at least one embodiment of various representations of the persistent memory pointer 442. An in-storage representation 502 of the persistent memory pointer 442 includes the SRID 430 concatenated with the SID 438 and the offset 446. In the illustrative embodiment, the SRID 430 and the SID 438 are 4-bit values, and the offset 446 is a 48-bit value. A runtime representation 504 of the persistent memory pointer 442 includes the DRID 436 concatenated with the SID 438 and the offset 446. In the illustrative embodiment, the DRID 436 and the SID 438 are 4-bit values, and the offset 446 is a 48-bit value. A virtual address representation 506 associated with the persistent memory pointer 442 includes a single 64-bit virtual address 508. As shown, the in-storage representation 502 and the runtime representation 504 may include 56 bits. In some embodiments, the representations 502, 504 may be padded to include 64 bits or another number of bits.

Referring back to FIGS. 3A and 3B, after dereferencing the persistent memory pointer or determining not to dereference the persistent memory pointer, the method 300 proceeds to block 348, shown in FIG. 3B. In block 348, the computing device 100 determines whether to assign a reference to a target data object to a persistent memory pointer. Similar to dereferencing the persistent memory pointer, the computing device 100 may assign persistent memory pointers in response to high-level language programming constructs, API or system calls, low-level instructions generated by a compiler or assembler, or any other request to assign a persistent memory pointer. If the computing device 100 determines not to assign a persistent pointer, the method 300 loops back to block 302, shown in FIG. 3A, to continue processing persistent memory accesses. If the computing device 100 determines to assign the persistent memory pointer, the method 300 advances to block 350.

In block 350, the computing device 100 determines a virtual memory address of the persistent memory pointer. The virtual memory address represents the storage location within the persistent memory 128 that will contain an in-storage representation of the persistent memory pointer. For example, the virtual memory address may correspond to an lvalue of an assignment statement or the target address of a memory store processor instruction. To be clear, the virtual memory address does not represent the address of the target of the persistent memory pointer, which may be determined by dereferencing the persistent memory pointer as described above. The virtual memory address may be determined by the computing device 100 using any appropriate technique. For example, in some embodiments, the virtual memory address may be determined by a compiler, assembler, or linker at compile time or at program load time. As another example, the virtual memory address may be determined by dereferencing a traditional pointer or a second persistent memory pointer, for example a pointer returned by a runtime persistent memory support library.

In block 352, the computing device 100 determines a runtime representation of a persistent memory pointer corresponding to the target data object that is to be assigned to the persistent memory pointer. As described above, the runtime representation includes the dynamic region identifier (DRID) of the NVRegion that includes the target data object, the segment identifier (SID) of the segment that includes the target data object, and the offset of the target data object within the segment. The computing device 100 may use any technique to determine the runtime representation. For example, the computing device 100 may determine the runtime representation based on the in-storage representation of another persistent memory pointer, as described above in connection with blocks 336, 338, or based on the contents of various data tables including the open region table, the region segment table and/or the segment table of the associated NVRegion.

In block 354, the computing device 100 indexes the dynamic-to-static (D2S) table in the volatile memory 126 associated with the NVRegion containing the virtual memory address of the persistent memory pointer (and not the NVRegion containing the target data object) with the DRID to retrieve the static region identifier (SRID) associated with the NVRegion that contains the target data object. In block 356, the computing device 100 determines whether a valid SRID for the NVRegion containing the target data object is included in the SRID table. As described above, the SRID table included in the metadata of the NVRegion including the persistent memory pointer includes entries for other NVRegions that are referenced by persistent memory pointers. Thus, if the NVRegion containing the target data object has not previously been referenced from the NVRegion containing the persistent memory pointer, then the D2S table may not include an entry for the DRID of the NVRegion containing the target data object or may include an invalid entry (e.g., a negative number, a null value, or other invalid entry). If a valid SRID is found, then the method 300 branches ahead to block 362. If no valid SRID is found, the method 300 advances to block 358.

In block 358, the computing device 100 creates a new entry in the SRID table stored in the metadata of the NVRegion containing the persistent memory pointer. Accordingly, as described above, the new entry in the SRID table is stored in the persistent memory 128. The new entry in the SRID table corresponds to the NVRegion that includes the target data object and may include the name or other identifier of that NVRegion. The index of the new entry in the SRID table is the SRID of the NVRegion that includes the target data object. In block 360, after updating the SRID table in the persistent memory 128, the computing device 100 updates the static-to-dynamic table and the dynamic-to-static table in the volatile memory 126 accordingly. For example, the computing device 100 may index the S2D table with the SRID of the target NVRegion and store the DRID of the target NVRegion in the S2D table. The computing device 100 may also index the D2S table with the DRID of the target NVRegion and store the SRID of the target NVRegion in the D2S table.

In block 362, the computing device 100 creates an in-storage representation of the persistent memory pointer that includes the SRID of the target NVRegion as well as the SID and the offset of the target data object. In block 364, the computing device 100 stores the in-storage representation of the persistent memory pointer at the virtual memory address of the persistent memory pointer, in the persistent memory 128. The computing device 100 may store the in-storage representation using, for example, one or more processor store instructions. After storing the in-storage representation, the method 300 loops back to block 302, shown in FIG. 3A, to continue processing persistent memory accesses.

Referring again to FIG. 4, in an illustrative embodiment, the computing device 100 may assign the address of the persistent data object 444 to the persistent memory pointer 442. Illustratively, the virtual memory address of the persistent memory pointer 442 may equal the virtual base address of the segment 416—within the NVRegion 402—added to an appropriate offset. The runtime representation of the persistent memory pointer that targets the persistent data object 444 may include the DRID 436, the SID 438, and the offset 446.

The computing device 100 may index the D2S table 410 with the DRID 436 to retrieve the SRID 430. If the SRID 430 is not yet included in the SRID table 420 of the NVRegion 402, then the D2S table 410 may include an invalid value (e.g., −1) for the index DRID 436. In response to retrieving an invalid SRID, the computing device 100 may add an entry to the SRID table 420 at the index SRID 430 that corresponds to the NVRegion 404, for example by including the name 428 of the NVRegion 404.

After ensuring that the SRID 430 is represented in the SIRD table 420, the computing device 100 generates an in-storage representation of the persistent memory pointer including the SRID 430, the SID 438, and the offset 446. The computing device 100 stores the in-storage representation into the persistent memory pointer 442 within the persistent memory 128, for example by executing a processor store instruction.

Figure 6A:
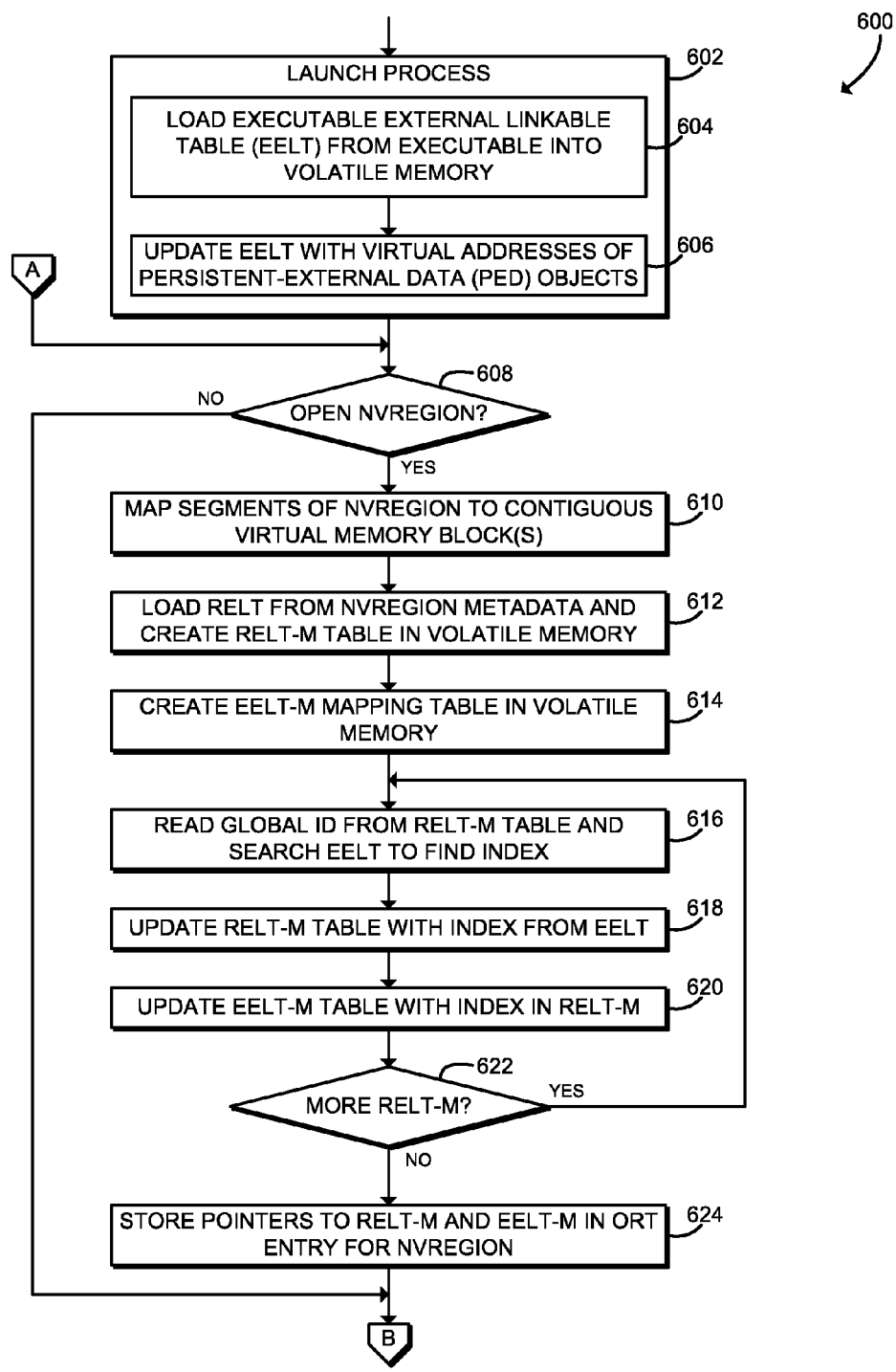
FIGS. 6A and 6B are a simplified flow diagram of at least one embodiment of a method for persistent-export pointer access that may be executed by the computing device of FIGS. 1 and 2.
Figure 6B:
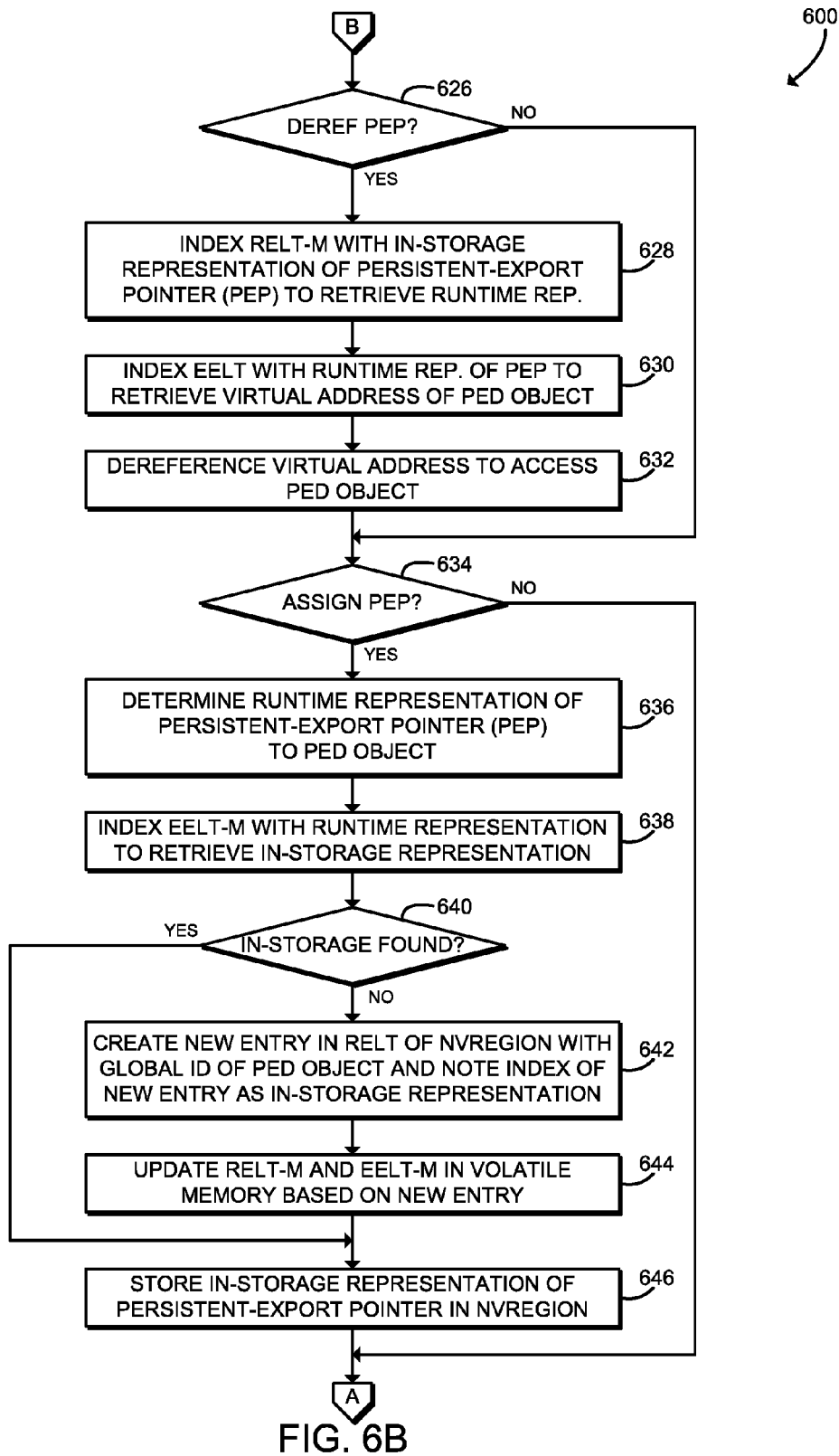

Referring now to FIGS. 6A and 6B, in use the computing device 100 may execute a method 600 for persistent-external pointer access. The method 600 begins in block 602, in which the computing device 100 launches a process, thread, executable, or other computer program. The computing device 100 may launch the process by loading one or more executable files (e.g., application executables, shared libraries, or other executables) from the data storage device 130 or other long-term storage into the volatile memory 126. The computing device 100 may create a virtual memory space for the process and may map each part of the executable into different parts of the virtual memory space. The computing device 100 may map the parts of the executable into different parts of the virtual memory space each time the executable is launched, for example by using address space layout randomization (ASLR) features provided by an operating system of the computing device 100.

In block 604, the computing device 100 loads an executable external linkable table (EELT) from the executable into the volatile memory 126. The EELT includes entries for all of the persistent-external data (PED) objects included in the executable. PED objects may be embodied as any function, global data object, or other in-memory object of the process that may be accessed from a persistent-external pointer in the persistent memory 128. Each PED object may be identified with a global identifier such as a name, identifier, mangled name, or other identifier that is unique among the PED objects of the process, and the EELT may include entries that are searchable by global identifier. As described above, the EELT or a representation of the EELT may be included in the binary executable file of the process and may be created at compile-time or link-time by a compiler, assembler, or linker. As described further below, the index of an entry in the EELT may be used an a runtime representation of a persistent-external pointer to the corresponding PED object. In block 606, the computing device 100 updates the in-memory EELT with virtual addresses of the loaded PED objects. The computing device 100 may, for example, search the EELT for the global identifier of a PED object and update a corresponding EELT entry with the corresponding virtual memory address of the PED.

In block 608, the computing device 100 determines whether to open a nonvolatile memory region. As described above, the persistent memory 128 may be subdivided into one or more regions known as nonvolatile regions or "NVRegions." Each of the NVRegions includes metadata and one or more segments including persistent data. As described below, the segments of the NVRegion are mapped to a contiguous block of virtual memory, although the segments may not be stored contiguously in the persistent memory 128. Additionally, the NVRegion may be mapped to a different location in the virtual memory space every time it is opened. The computing device 100 may use any technique for determining whether to open the NVRegion. For example, the computing device 100 may open the NVRegion in response to an application programming interface (API) call, system call, or other command generated by a running process. The NVRegion may already exist in the persistent memory 128, or the computing device 100 may create a new NVRegion. If the computing device 100 determines not to open an NVRegion (e.g., during execution of a process after one or more NVRegions have already been opened), the method 600 branches ahead to block 626, shown in FIG. 6B. If the computing device 100 determines to open an NVRegion, the method 600 advances to block 610.

In block 610, the computing device 100 maps the segments of the NVRegion to one or more contiguous virtual memory blocks. In block 612, the computing device 100 loads a region external linkable table (RELT) from the metadata of the NVRegion, stored in the persistent memory 128. The RELT includes entries relating to the PED objects that are referenced by persistent-external pointers stored in the NVRegion being opened. Each entry in the RELT may include the global identifier of the corresponding PED object. The computing device 100 creates an RELT mapping table (RELT-M) in the volatile memory 126 based on the contents of the RELT. The RELT-M is associated with the NVRegion being opened, and thus multiple RELT-M tables may exist for each process of the computing device 100. As created in block 612, the RELT-M may contain the same information as the RELT, e.g., the global identifiers of all PED objects referenced from the NVRegion. In block 614, the computing device 100 creates an EELT mapping table (EELT-M) in the volatile memory 126. The EELT-M may contain an entry for every entry in the EELT, and each entry may be initialized to an invalid index value (e.g., a negative or null value). The EELT-M is associated with the NVRegion being opened, and thus multiple EELT-M tables may exist for each process of the computing device 100.

In block 616, the computing device 100 reads a global identifier of a PED object from the RELT-M table and searches the EELT to find the associated index of the PED object. The index of the PED object may be embodied as, for example, a nonnegative integer or other index value. In block 618, the computing device 100 updates the RELT-M table with the index determined from the EELT. The computing device 100 may, for example find an entry in the RELT-M corresponding to the global identifier of the PED object and then store the index from the EELT into the entry of the RELT-M. In block 620, the computing device 100 updates the EELT-M with the index of the entry in the RELT-M. The computing device 100 may, for example, index the EELT-M using the index in the EELT determined in block 616 and then store the index of the corresponding entry in the RELT-M into the EELT-M. After updating the RELT-M and the EELT-M, the computing device 100 may be capable of quickly converting between indexes in each of the RELT-M and EELT-M tables.

In block 622, the computing device 100 determines whether additional entries exist in the RELT-M table. If so, then the method 600 loops back to block 616 to process the next entry in the RELT-M. If no more entries remain, the method 600 advances to block 624, in which the computing device 100 stores pointers to the RELT-M and EELT-M tables into an entry in an open region table (ORT) that corresponds to the NVRegion being opened. The ORT may be embodied as or similar to the open region table described above in connection with FIGS. 3A to 5. After opening the NVRegion, the method 600 proceeds to block 626, shown in FIG. 6B.

Figure 7:
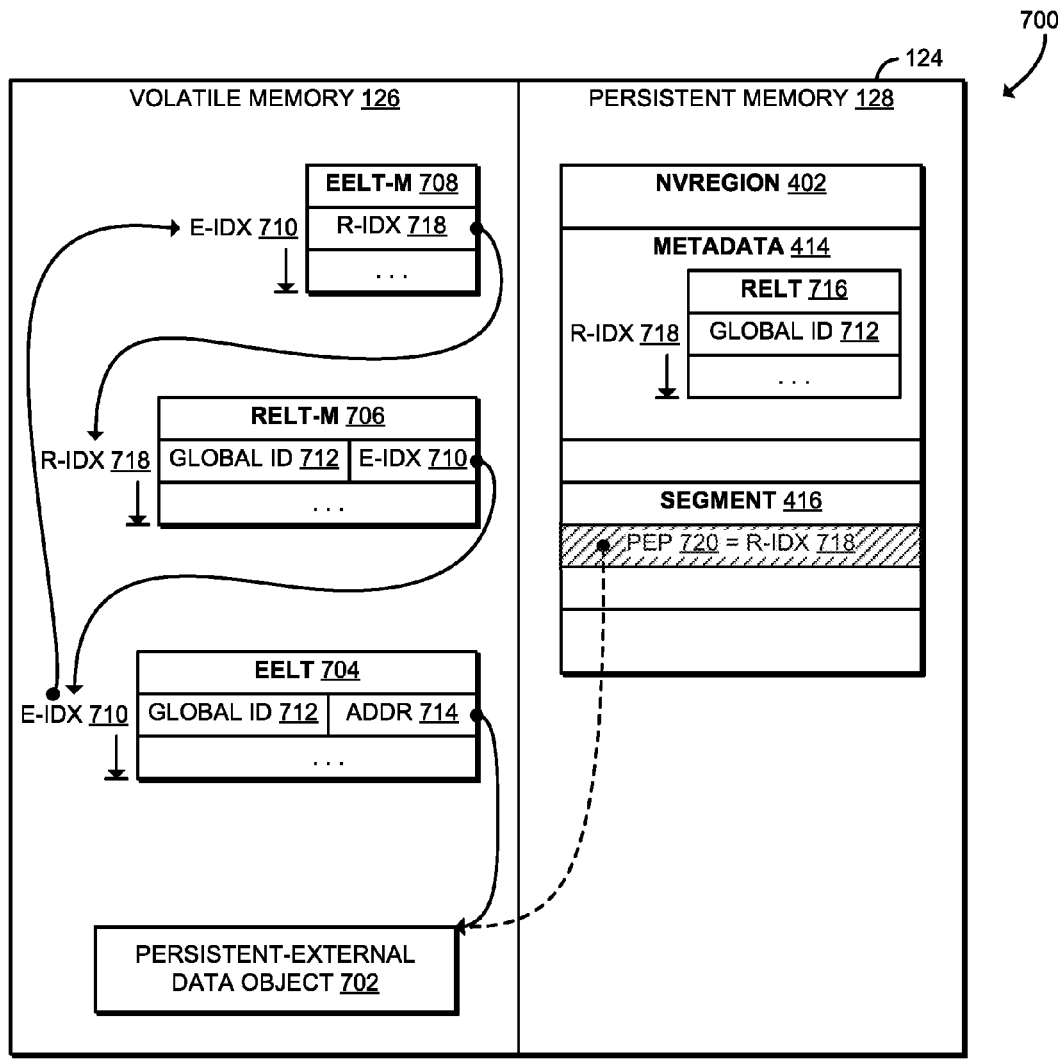
FIG. 7 is a schematic diagram illustrating additional memory structures that may be established by the computing device of FIGS. 1 and 2.

Referring now to FIG. 7, a schematic diagram 700 illustrates the memory 124 of the computing device 100 after an NVRegion has been loaded as described above in connection with FIG. 6A. As shown, the persistent memory 128 includes one open NVRegion 402, and the volatile memory 126 includes a persistent-external data object 702, an executable external linkable table (EELT) 704, a region external linkable mapping table (RELT-M) 706 and an executable external linkable mapping table (EELT-M) 708. The volatile memory 126 may also include an open region table (ORT) that is omitted for clarity of the present disclosure.

As described above, the EELT 704 is loaded when a process or other application is launched, and includes entries for each persistent-external data object included in that process. Each entry may include information identifying the PED object such as a global identifier and a virtual memory address of the PED object. The index of each entry in the EELT 704 is used as a runtime representation of persistent-export pointers to the associated PED object, as described further below. For example, as shown, an entry having an EELT index 710 may include a global identifier 712 and a virtual address 714 that are associated with the PED object 702.

The NVRegion 402 includes metadata 414 and a single segment 416. The metadata 414 includes a region external linkable table (RELT) 716. The RELT 716 includes entries for each persistent-external data (PED) object that is referenced by a persistent-export pointer in the NVRegion. Each entry may include information identifying a PED object, such as the global identifier of the PED object. The index of each entry in the RELT 716 is used as the in-storage representation of the persistent-export pointer to the associated PED object, as described further below. For example, as shown, an entry having an RELT index 718 may include the global identifier 712 corresponding to the PED object 702.

As described above, the NVRegion 402 is associated with the RELT-M 706 and the EELT-M 708 stored in the volatile memory 126. The RELT-M 706 is indexed by the RELT index of a PED object—that is, by the in-storage representation of a persistent-export pointer to the PED object—and includes entries with the EELT index of the corresponding PED object—that is, the runtime representation of the persistent-export pointer to the PED object. For example, as shown, an entry having the RELT index 718 includes the EELT index 710 corresponding to the PED object 702. That entry in the RELT-M 706 may also include additional information relating to the PED object 702, such as the global identifier 712.

Similarly, the EELT-M 708 is indexed by the EELT index of a PED object—that is, by the runtime representation of a persistent-export pointer to the PED object—and includes entries with the RELT index of the corresponding PED object—that is, the in-storage representation of the persistent-export pointer to the PED object. For example, as shown, an entry having the EELT index 710 includes the RELT index 718 corresponding to the PED object 702.

Referring back to FIGS. 6A and 6B, after opening one or more NVRegions, the method 600 continues with block 626, shown in FIG. 6B. In block 626, the computing device 100 determines whether to dereference a persistent-export pointer (PEP). Dereferencing the persistent-export pointer allows the computing device 100 to find a virtual address of the target of the persistent-export pointer, corresponding to a persistent-external data object such as a function or global data object. The computing device 100 may dereference persistent-export pointers in response to high-level language programming constructs, API or system calls, low-level instructions generated by a compiler or assembler, or any other request to dereference a persistent-export pointer. Thus, the determination of whether to dereference the persistent-export pointer may be determined using compiler or language support as described below in connection with FIG. 8. If the computing device 100 determines not to dereference a persistent-export pointer, the method 600 branches ahead to block 634. If the computing device 100 determines to dereference the persistent-export pointer, the method 600 advances to block 628.

In block 628, the computing device 100 indexes the RELT-M with the in-storage representation of the persistent-export pointer to retrieve the runtime representation of the persistent-export pointer. The in-storage representation of the persistent-export pointer may be embodied as an integer or other data that may be used to index the RELT-M, and similarly, the runtime representation of the persistent-export pointer may be embodied as an integer or other data that may be used to index the EELT and/or the EELT-M. The computing device 100 may index the RELT-M by loading the persistent-export pointer from the persistent memory 128, for example by executing one or more processor load instructions.

In block 630, the computing device 100 indexes the EELT with the runtime representation of the persistent-export pointer to retrieve the virtual memory address of the target PED object. The virtual address may be embodied as any virtual memory address, linear address, physical address, or other address that may be used by the computing device 100 to access the target PED object. For example, the virtual address may be embodied as a 64-bit linear memory address. In block 632, the computing device 100 dereferences the virtual address to access the PED object. The computing device 100 may, for example execute one or more processor instructions to load the data from the virtual address into one or more registers of the processor 120, jump to the virtual address of the PED object, or otherwise access the PED object.

Referring again to FIG. 7, the schematic diagram 700 includes a persistent-export pointer 720 located in the NVRegion 402 that references the PED object 702. Thus, the in-storage representation of the illustrative persistent-export pointer 720 includes the RELT index 718 associated with the PED object 702. To dereference the persistent-export pointer 720, the computing device 100 may index the RELT-M 706 with the value of the persistent-export pointer 720 to retrieve the EELT index 710. Next, the computing device 100 may index the EELT 704 with the EELT index 710 to retrieve the virtual address 714 of the PED object 702.

Referring back to FIGS. 6A and 6B, after dereferencing the persistent-external pointer or determining not to dereference the persistent-external pointer, the method 600 proceeds to block 634, shown in FIG. 6B. In block 634, the computing device 100 determines whether to assign a virtual memory address of a PED object to a persistent-export pointer. Similar to dereferencing the persistent-export pointer, the computing device 100 may assign persistent-export pointers in response to high-level language programming constructs, API or system calls, low-level instructions generated by a compiler or assembler, or any other request to assign a persistent-export pointer. If the computing device 100 determines not to assign a persistent-export pointer, the method 600 loops back to block 608, shown in FIG. 6A, to continue processing persistent-external data accesses. If the computing device 100 determines to assign the persistent-export pointer, the method 600 advances to block 636.

In block 636, the computing device 100 determines the runtime representation of a persistent-export pointer (PEP) to the target persistent-external data (PED) object. As described above, the runtime representation may be embodied as the index in the EELT of an entry associated with the target PED object. The computing device 100 may use any technique to determine the runtime representation. For example, in some embodiments, the runtime representation may be determined by a compiler, assembler, or linker at compile time or at program load time. As another example, the runtime representation may be determined by referencing data tables such as the EELT.

In block 638, the computing device 100 indexes the EELT-M with the runtime representation to retrieve the in-storage representation of the persistent-external pointer to the PED object. In block 640, the computing device 100 determines whether an in-storage representation of the persistent-external pointer was found. As described above, the in-storage representation corresponds to the index of an entry in the RELT of the NVRegion that corresponds to the PED object. Therefore, if the PED object has not previously been referenced from the NVRegion, then the EELT-M may not include an entry with a valid in-storage representation associated with the PED object. If a valid in-storage representation was found, the method 600 branches ahead to block 646. If a valid in-storage representation was not found, the method 600 advances to block 642.

In block 642, the computing device 100 creates a new entry in the RELT of the NVRegion corresponding to the target PED object. The new entry is stored in the metadata of the NVRegion within the persistent memory 128 and thus will be available when the NVRegion is subsequently opened. The new entry in the RELT includes the global identifier of the target PED object. As described above, the index of the new entry in the RELT may be used as the in-storage representation of persistent-export pointers to the target PED object. In block 644, the computing device 100 updates the RELT-M and EELT-M tables in the volatile memory 126 based on the new entry in the RELT. The computing device 100 may index the RELT-M with the index of the new entry and store the corresponding index of the PED object from the EELT-M, and the computing device 100 may index the EELT-M with the index of the PED object and store the corresponding index from the RELT-M.

In block 646, the computing device 100 stores the in-storage representation of the persistent-export pointer to the persistent memory 128. The computing device 100 may store the in-storage representation using, for example, one or more processor store instructions. After storing the in-storage representation, the method 600 loops back to block 608, shown in FIG. 6A, to continue processing persistent memory accesses.

Referring again to FIG. 7, in an illustrative embodiment the computing device 100 may assign the persistent-external data object 702 to the persistent-export pointer 720 in the persistent memory 128. The computing device 100 may determine the runtime representation of the pointer to be the EELT index 710 associated with the PED object 702. The computing device 100 may index the EELT-M with the EELT index 710 to retrieve the RELT index 718. If the RELT index 718 is not yet included in the RELT 716 of the NVRegion 402, then the EELT-M 708 may include an invalid value (e.g., −1) for the EELT index 710. In response to retrieving an invalid index, the computing device 100 may add an entry to the RELT 716 at the RELT index 718 that corresponds to the PED object 702, for example by including the global identifier 712 of the PED object 702.

After ensuring that the RELT index 718 is represented in the RELT 716, the computing device 100 generates an in-storage representation of the persistent-export pointer including the RELT index 718. The computing device 100 stores the in-storage representation 718 into the persistent-export pointer 720 within the persistent memory 128, for example by executing a processor store instruction.

Figure 8:
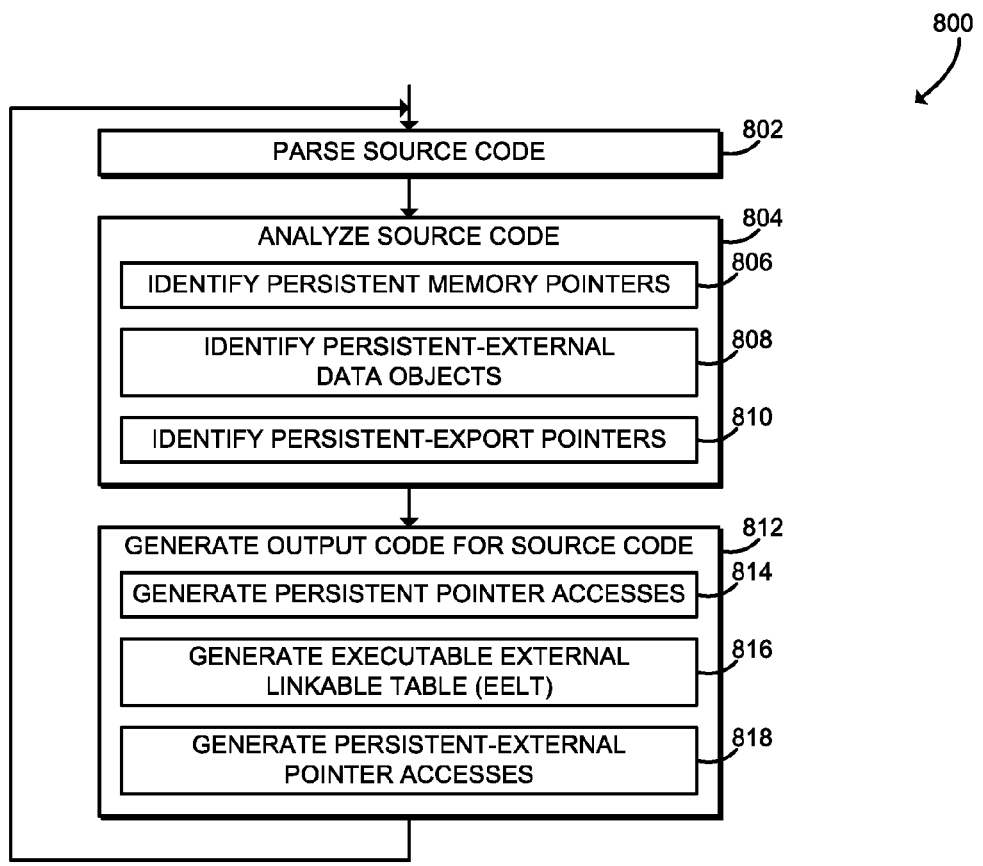
FIG. 8 is a simplified flow diagram of at least one embodiment of a method for compiling source code with persistent memory pointer support that may be executed by the computing device of FIGS. 1 and 2.

Referring now to FIG. 8, in use, the computing device 100 may execute a method 800 for compiling source code 202 that includes persistent pointer access. The method 800 begins in block 802, in which the computing device 100 parses the source code 202. The parse stage of block 802 may generate an in-memory representation of the source code 202 that may be analyzed and modified by later stages of the compiler 204. For example, the compiler 204 may generate an abstract syntax tree ("AST") or an intermediate representation of the source code 202. The intermediate representation may be embodied as a graph structure connecting basic blocks of instructions targeting an abstract computing device.

In block 804, the computing device 100 analyzes the source code 202. The computing device 100 may identify various control structures, data types, or other programming constructs specified by the programmer and included in the intermediate representation. In block 806, the computing device 100 may identify persistent memory pointers in the source code 202. Persistent memory pointers may be identified manually, for example using a specialized keyword such as "persistent," or using specialized data types. In some embodiments, persistent memory pointers may be identified automatically, for example based on whether a pointer access is determined to refer to the persistent memory 128.

In block 808, the computing device 100 identifies persistent-external data objects in the source code 202. As described above, persistent-external data objects may be embodied as global objects such as functions and global program data that may be accessed by pointers stored in persistent memory 128. Persistent-external data may be identified manually, for example using a specialized keyword such as "pep," or using specialized data types. In some embodiments, persistent-external data may be identified automatically, for example based on whether a function pointer is stored in the persistent memory 128.

In block 810, the computing device 100 identifies persistent-export pointers in the source code 202. As described above, persistent-export pointers may be embodied as pointers stored in the persistent memory 128 that refer to global objects such as functions and global program data. Persistent-export pointers may be identified manually, for example using a specialized keyword such as "pep," or using specialized data types. In some embodiments, persistent-export pointers may be identified automatically, for example based on whether a function pointer is stored in the persistent memory 128.

In block 812, the computing device 100 generates output code based on the in-memory representation of the source code 202. In some embodiments, the generated output code may be embodied as a list of instructions for a particular target computing device. The output code may be executable code 206, object code that may be linked to produce the executable code 206, or intermediate code that may be further processed by the compiler 204. In some embodiments, the computing device 100 may generate output code that references pre-existing library code to perform the described operations, such as one or more runtime support libraries.

In block 814, the computing device 100 may generate code for persistent memory pointer accesses. As described above, a persistent memory pointer access may include an operation to dereference a persistent memory pointer and generate a corresponding virtual memory address and/or an operation to assign a reference to a target data object to the persistent memory pointer. The computing device 100 may generate code to cause the target computing device to perform one or more of the persistent memory pointer access operations described above in connection with FIGS. 3A to 5.

In block 816, the computing device 100 may generate an executable external linkable table (EELT) based on the persistent-external data objects identified in block 808. As described above, the EELT includes information regarding the persistent-external data objects included in a particular process and/or executable. The computing device 100 may output a table including a global identifier for each persistent-external data object such as a name, mangled name, or other identifier that is unique within the process and/or executable. As described above, the particular virtual address associated with each persistent-external data objects may be supplied or otherwise fixed up at link time, at load time, and/or at run time.

In block 818, the computing device 100 may generate code for persistent-export pointer accesses. As described above, a persistent-export pointer access may include an operation to dereference a persistent-export pointer and generate a corresponding virtual memory address and/or an operation to assign a reference to a persistent-external data object to the persistent-export pointer. The computing device 100 may generate code to cause the target computing device to perform one or more of the persistent-export pointer access operations described above in connection with FIGS. 6A to 7. After generating the output code in block 812, the method 800 loops back to block 802 to continue processing the source code 202.

Figure 9:
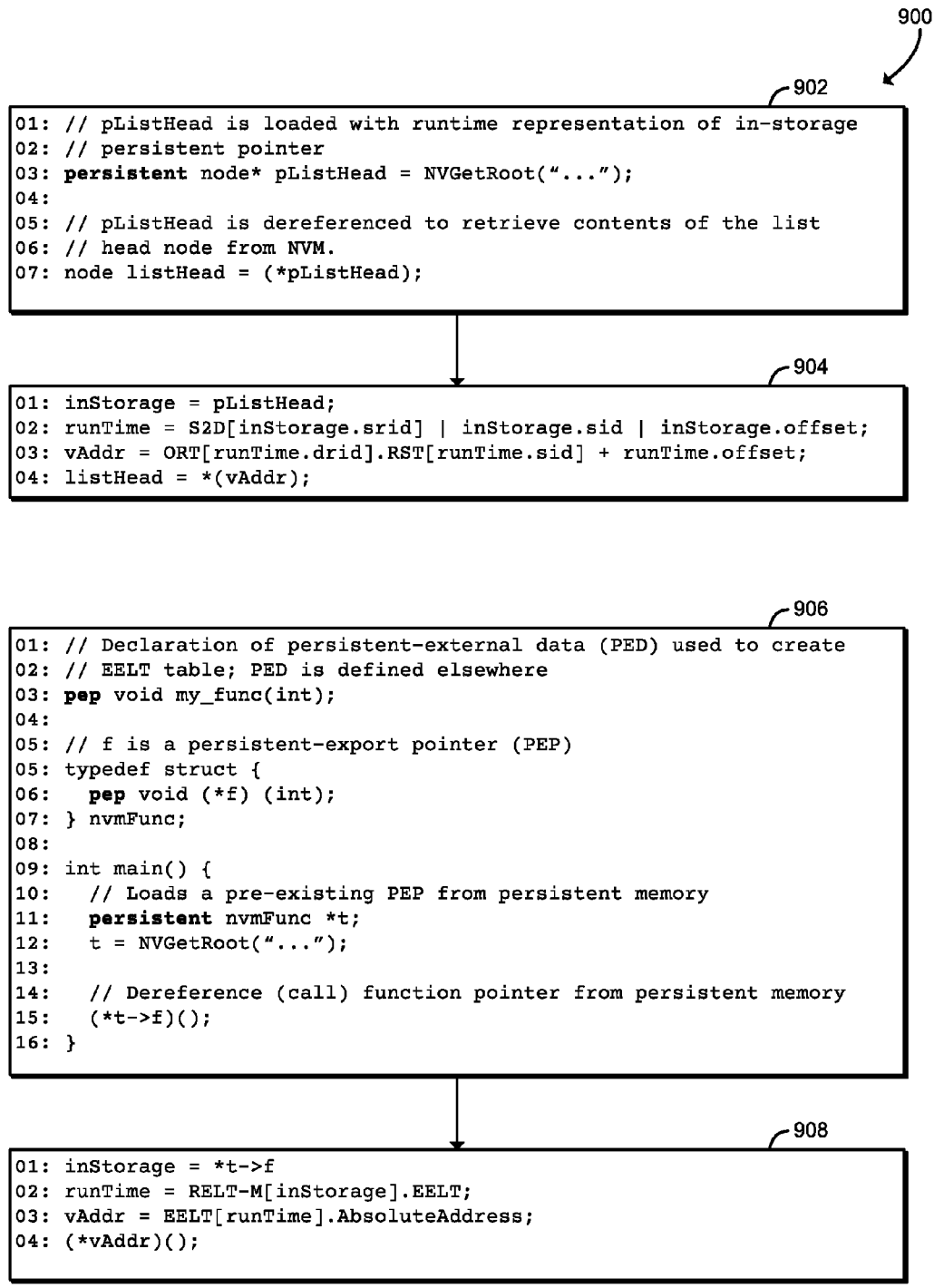
FIG. 9 is pseudocode representing code that may be compiled by the computing device of FIGS. 1 and 2.

Referring now to FIG. 9, pseudocode 900 illustrates example source code 202 that may be compiled by the compiler 204 during execution of the method 800. The pseudocode 900 includes a source code segment 902 that includes a persistent memory pointer access. As shown, a persistent pointer pListHead is loaded from the persistent memory 128 using a library function NVGetRoot in statement 03 and then dereferenced in statement 07.

The pseudocode 900 illustrates an output code segment 904 that may be generated by the compiler 204 based on the source code segment 902. The output code segment 904 includes a statement 01 in which the in-storage representation of the persistent memory pointer is loaded from the persistent memory 128. In statement 02, a runtime representation of the persistent memory pointer is generated by indexing the static-to-dynamic (S2D) table with the static region identifier (SRID) from the in-storage representation and concatenating the segment identifier (SID) and offset from the in-storage representation. In statement 03, a virtual address of the target data object is generated by indexing the open region table (ORT) with the dynamic region identifier (DRID), accessing the associated region segment table (RST), indexing the RST with the SID, and adding the offset. In statement 04, the virtual address is dereferenced.

The pseudocode 900 further includes a source code segment 906 that includes a persistent-export pointer reference. The source code segment 902 includes a statement 03, in which a persistent-external data object is declared. In the illustrative example, the persistent-external data object is a global function named my_func. Statement 06 defines a persistent-export pointer type that may be used to reference a persistent-external data object such as the function my_func. Statement 15 dereferences a persistent-export pointer to call the associated function.

The pseudocode 900 illustrates an output code segment 908 that may be generated by the compiler 204 based on the source code segment 906. The output code segment 908 includes a statement 01 in which the in-storage representation of the persistent-export pointer is loaded from the persistent memory 128. In statement 02, a runtime representation of the persistent-export pointer is generated by indexing the region external linkable mapping table (RELT-M) with the in-storage representation and retrieving the associated EELT member. In statement 03, a virtual address of the persistent-external data object is generated by indexing the executable external linkable table (EELT) with the runtime representation and retrieving the associated AbsoluteAddress member. In statement 04, the virtual address is dereferenced, which illustratively calls the function located at the virtual address.

Although illustrated with specific input source code and output code, it should be understood that in some embodiments the compiler 204 may generate different output code to perform the same operations. For example in some embodiments the compiler 204 may eliminate temporary variables, combine statements, and/or otherwise optimize the output code.

EXAMPLES

Illustrative examples of the technologies disclosed herein are provided below. An embodiment of the technologies may include any one or more, and any combination of, the examples described below.

Example 1 includes a computing device for persistent memory pointer access, the computing device comprising a persistent memory, wherein the persistent memory includes a first nonvolatile region and a second nonvolatile region; a volatile memory; and a persistent memory pointer access module to: load a persistent memory pointer from the first nonvolatile region, wherein a target address of the persistent memory pointer is in the second nonvolatile region, and wherein the persistent memory pointer includes a static region identifier associated with the second nonvolatile region, a segment identifier, and an offset; index a static-to-dynamic table with the static region identifier to retrieve a dynamic region identifier associated with the second nonvolatile region, wherein the static-to-dynamic table is associated with the first nonvolatile region and is included in the volatile memory; index an open region table with the dynamic region identifier to retrieve a virtual base address of a region segment table associated with the second nonvolatile region; wherein the open region table and the region segment table are included in the volatile memory; index the region segment table with the segment identifier to retrieve a virtual base address of a persistent memory segment of the second nonvolatile region; and add the virtual base address of the persistent memory segment to the offset to determine the target address of the persistent memory pointer.

Example 2 includes the subject matter of Example 1, and wherein the first nonvolatile region is different from the second nonvolatile region.

Example 3 includes the subject matter of any of Examples 1 and 2, and wherein the persistent memory pointer access module is further to dereference the target address to access a persistent memory data object in response to an addition of the virtual base address of the persistent memory segment to the offset.

Example 4 includes the subject matter of any of Examples 1-3, and wherein the persistent memory pointer access module is further to generate a runtime representation of the persistent memory pointer in response to an indexing of the static-to-dynamic table, wherein the runtime representation includes the dynamic region identifier, the segment identifier, and the offset.

Example 5 includes the subject matter of any of Examples 1-4, and further comprising a non-volatile region metadata processing module to read a first entry from a static region identifier table associated with the first nonvolatile region, wherein the static region identifier table is included in the persistent memory, the first entry includes a region name associated with the second nonvolatile region, and an index of the first entry comprises the static region identifier associated with the second nonvolatile region; search the open region table for the region name, wherein an index of the region name in the open region table comprises the dynamic region identifier; and index the static-to-dynamic table with the static region identifier to store the dynamic region identifier.

Example 6 includes the subject matter of any of Examples 1-5, and wherein the non-volatile region metadata processing module is further to determine whether the second nonvolatile region is open in response to a search of the open region table; open the second nonvolatile region in response to a determination that the second region is not open; and add a first entry in the open region table in response to an opening of the second nonvolatile region, wherein the first entry of the open region table includes the region identifier of the second nonvolatile region and an index of the first entry comprises the dynamic region identifier.

Example 7 includes the subject matter of any of Examples 1-6, and wherein the non-volatile region metadata processing module is further to store the virtual base address of the region segment table associated with the second nonvolatile region in response to an addition of the first entry in the open region table.

Example 8 includes the subject matter of any of Examples 1-7, and wherein the non-volatile region metadata processing module is further to read a first entry from a segment table associated with the second nonvolatile region, wherein the first entry is associated with the persistent memory segment of the second nonvolatile region, and wherein an index of the first entry comprises the segment identifier; map the persistent memory segment to a virtual memory space of the computing device in response to a reading of the first entry; and store the virtual base address of the first persistent memory segment to the region segment table in response to a mapping of the persistent memory segment.

Example 9 includes the subject matter of any of Examples 1-8 and wherein the persistent memory pointer access module is further to determine a runtime representation of the persistent memory pointer, wherein the runtime representation includes the dynamic region identifier, the segment identifier, and the offset; index a dynamic-to-static table with the dynamic region identifier to retrieve the static region identifier, wherein the dynamic-to-static table is associated with the first nonvolatile region and is included in the volatile memory; generate an in-storage representation of the persistent memory pointer, wherein the in-storage representation includes the static region identifier, the segment identifier, and the offset; and store the in-storage representation of the persistent memory pointer to the persistent memory.

Example 10 includes the subject matter of any of Examples 1-9, and further comprising a non-volatile region metadata processing module to determine whether a static region identifier table associated with the first nonvolatile region includes an entry associated with the second nonvolatile region, wherein the static region identifier table is included in the persistent memory; and add a first entry associated with the second nonvolatile region to the static region identifier table in response to determination that the static region identifier table does not include an entry associated with the second nonvolatile region, wherein an index of the first entry comprises the static region identifier associated with the second nonvolatile region.

Example 11 includes the subject matter of any of Examples 1-10, and wherein the non-volatile region metadata processing module is further to update the dynamic-to-static table to include the static region identifier associated with the dynamic region identifier in response to an addition of the first entry to the static region identifier table; and update the static-to-dynamic table to include the dynamic region identifier associated with the static region identifier in response to the addition of the first entry to the static region identifier table.

Example 12 includes a computing device for persistent-export pointer access, the computing device comprising a persistent memory, wherein the persistent memory includes a first nonvolatile region; a volatile memory; and a persistent-export pointer access module to: load an in-storage representation of a persistent-export pointer from the first nonvolatile region, wherein a target address of the persistent-export pointer is within the volatile memory and is associated with a persistent-external data object; index a region-external linkable mapping table with the in-storage representation of the persistent-export pointer to retrieve a runtime representation of the persistent-export pointer, wherein the region-external linkable mapping table is associated with the first nonvolatile region and is included in the volatile memory; and index an executable external linkable table with the runtime representation to retrieve the target address associated with the persistent-external data object, wherein the executable external linkable table is associated with an executable process of the computing device and is included in the volatile memory.

Example 13 includes the subject matter of Example 12, and wherein the persistent-export pointer access module is further to dereference the target address to access the persistent-external data object in response to an indexing of the executable external linkable table.

Example 14 includes the subject matter of any of Examples 12 and 13, and wherein the persistent-external data object comprises a function.

Example 15 includes the subject matter of any of Examples 12-14, and further comprising a dynamic loader module to load the executable process; map the persistent-external data object to the target address in response to a loading of the executable process; and update the executable external linkable table with the target address in response to a mapping of the persistent-external data object.

Example 16 includes the subject matter of any of Examples 12-15, and further comprising a non-volatile region metadata processing module to load a first entry from a region-external linkable table associated with the first nonvolatile region, wherein the region-external linkable table is included in the persistent memory, the first entry includes a global identifier associated with the persistent-external data object, and an index of the first entry comprises the in-storage representation of the persistent-export pointer; search the executable external linkable table for the global identifier to determine an index associated with the global identifier, wherein the index comprises the runtime representation of the persistent-export pointer; and index the region-external linkable mapping table with the in-storage representation of the persistent-export pointer to store the runtime representation.

Example 17 includes the subject matter of any of Examples 12-16, and wherein the persistent-export pointer access module is further to index an executable external linkable mapping table with the runtime representation to retrieve an in-storage representation of the persistent-export pointer, wherein the in-storage representation comprises a value of the persistent-export pointer, and wherein the executable external linkable mapping table is associated with the first nonvolatile region and is included in the volatile memory of the computing device; and store the in-storage representation of the persistent-export pointer to the persistent memory.

Example 18 includes the subject matter of any of Examples 12-17, and further comprising a non-volatile region metadata processing module to determine whether a region external linkable table associated with the first nonvolatile region includes an entry associated with the persistent-external data object, wherein the region external linkable table is included in the persistent memory; and add a first entry to the region external linkable table in response to a determination that the region external linkable table does not include an entry associated with the persistent-external data object, wherein an index of the first entry comprises the in-storage representation of the persistent-export pointer.

Example 19 includes the subject matter of any of Examples 12-18, and wherein the non-volatile region metadata processing module is further to update the region external linkable mapping table to include the runtime representation associated with the in-storage representation in response to an addition of the first entry to the region external linkable table; and update the executable external linkable mapping table to include the in-storage representation associated with the runtime representation in response to the addition of the first entry to the region external linkable table.

Example 20 includes a computing device for compiling code including persistent memory access, the computing device comprising a compiler to analyze source code including a persistent memory pointer access; and a persistent memory pointer code module to generate, in response to an analysis of the source code, output code for the persistent memory pointer access, wherein the output code is to cause a target computing device to: load a persistent memory pointer from a first nonvolatile region of a persistent memory of the target computing device, wherein a target address of the persistent memory pointer is in a second nonvolatile region of the persistent memory, and wherein the persistent memory pointer includes a static region identifier associated with the second nonvolatile region, a segment identifier, and an offset; index a static-to-dynamic table with the static region identifier to retrieve a dynamic region identifier associated with the second nonvolatile region, wherein the static-to-dynamic table is associated with the first nonvolatile region and is included in a volatile memory of the target computing device; index an open region table with the dynamic region identifier to retrieve a virtual base address of a region segment table associated with the second nonvolatile region; wherein the open region table and the region segment table are included in the volatile memory; index the region segment table with the segment identifier to retrieve a virtual base address of a persistent memory segment of the second nonvolatile region; and add the virtual base address of the persistent memory segment to the offset to determine the target address of the persistent memory pointer.

Example 21 includes the subject matter of Example 20, and wherein the output code is further to cause the target computing device to dereference the target address to access a persistent memory data object in response to an addition of the virtual base address of the persistent memory segment to the offset.

Example 22 includes the subject matter of any of Examples 20 and 21, and wherein the output code is further to cause the target computing device to generate a runtime representation of the persistent memory pointer in response to an indexing of the static-to-dynamic table, wherein the runtime representation includes the dynamic region identifier, the segment identifier, and the offset.

Example 23 includes the subject matter of any of Examples 20-22, and wherein the output code is further to cause the target computing device to determine a runtime representation of the persistent memory pointer, wherein the runtime representation includes the dynamic region identifier, the segment identifier, and the offset; index a dynamic-to-static table with the dynamic region identifier to retrieve the static region identifier, wherein the dynamic-to-static table is associated with the first nonvolatile region and is included in the volatile memory; generate an in-storage representation of the persistent memory pointer, wherein the in-storage representation includes the static region identifier, the segment identifier, and the offset; and store the in-storage representation of the persistent memory pointer to the persistent memory.

Example 24 includes the subject matter of any of Examples 20-23, and wherein the output code is further to cause the target computing device to determine whether a static region identifier table associated with the first nonvolatile region includes an entry associated with the second nonvolatile region, wherein the static region identifier table is included in the persistent memory; and add a first entry associated with the second nonvolatile region to the static region identifier table in response to a determination that the static region identifier table does not include an entry associated with the second nonvolatile region, wherein an index of the first entry comprises the static region identifier associated with the second nonvolatile region.

Example 25 includes the subject matter of any of Examples 20-24, and wherein the output code is further to cause the target computing device to update the dynamic-to-static table to include the static region identifier associated with the dynamic region identifier in response to an addition of the first entry to the static region identifier table; and update the static-to-dynamic table to include the dynamic region identifier associated with the static region identifier in response to the addition of the first entry to the static region identifier table.

Example 26 includes a computing device for compiling code including persistent-export pointer access, the computing device comprising a compiler to analyze source code including a persistent-export pointer access; and a persistent-export pointer code module to generate, in response to an analysis of the source code, output code for the persistent-export pointer access, wherein the output code is to cause a target computing device to: load an in-storage representation of a persistent-export pointer from a first nonvolatile region of a persistent memory of the target computing device, wherein a target address of the persistent-export pointer is within a volatile memory of the target computing device and is associated with a persistent-external data object; index a region-external linkable mapping table with the in-storage representation of the persistent-export pointer to retrieve a runtime representation of the persistent-export pointer, wherein the region-external linkable mapping table is associated with the first nonvolatile region and is included in the volatile memory; and index an executable external linkable table with the runtime representation to retrieve the target address associated with the persistent-external data object, wherein the executable external linkable table is associated with an executable process of the target computing device and is included in the volatile memory.

Example 27 includes the subject matter of Example 26, and wherein the output code is further to cause the target computing device to dereference the target address to access the persistent-external data object in response to an indexing of the executable external linkable table.

Example 28 includes the subject matter of any of Examples 26 and 27, and wherein the persistent-external data object comprises a function.

Example 29 includes the subject matter of any of Examples 26-28, and wherein the compiler is further to analyze source code including a persistent-external data object definition; and the computing device further comprises an export table module to generate, in response to an analysis of the source code including the persistent-external data object definition, output code including a static executable external linkable table, wherein the static executable external linkable table includes an entry associated with the persistent-external data object definition, wherein the entry includes a global identifier associated with the persistent-external data object.

Example 30 includes the subject matter of any of Examples 26-29, and wherein the output code is further to cause the target computing device to index an executable external linkable mapping table with the runtime representation to retrieve an in-storage representation of the persistent-export pointer, wherein the in-storage representation comprises a value of the persistent-export pointer, and wherein the executable external linkable mapping table is associated with the first nonvolatile region and is included in the volatile memory of the target computing device; and store the in-storage representation of the persistent-export pointer to the persistent memory.

Example 31 includes the subject matter of any of Examples 26-30, and wherein the output code is further to cause the target computing device to determine whether a region external linkable table associated with the first nonvolatile region includes an entry associated with the persistent-external data object, wherein the region external linkable table is included in the persistent memory; and add a first entry to the region external linkable table in response to a determination that the region external linkable table does not include an entry associated with the persistent-external data object, wherein an index of the first entry comprises the in-storage representation of the persistent-export pointer.

Example 32 includes the subject matter of any of Examples 26-31, and wherein the output code is further to cause the target computing device to update the region external linkable mapping table to include the runtime representation associated with the in-storage representation in response to an addition of the first entry to the region external linkable table; and update the executable external linkable mapping table to include the in-storage representation associated with the runtime representation in response to the addition of the first entry to the region external linkable table.

Example 33 includes a method for persistent memory pointer access, the method comprising loading, by a computing device, a persistent memory pointer from a first nonvolatile region of a persistent memory of the computing device, wherein a target address of the persistent memory pointer is in a second nonvolatile region of the persistent memory, and wherein the persistent memory pointer includes a static region identifier associated with the second nonvolatile region, a segment identifier, and an offset; indexing, by the computing device, a static-to-dynamic table with the static region identifier to retrieve a dynamic region identifier associated with the second nonvolatile region, wherein the static-to-dynamic table is associated with the first nonvolatile region and is included in a volatile memory of the computing device; indexing, by the computing device, an open region table with the dynamic region identifier to retrieve a virtual base address of a region segment table associated with the second nonvolatile region; wherein the open region table and the region segment table are included in the volatile memory; indexing, by the computing device, the region segment table with the segment identifier to retrieve a virtual base address of a persistent memory segment of the second nonvolatile region; and adding, by the computing device, the virtual base address of the persistent memory segment to the offset to determine the target address of the persistent memory pointer.

Example 34 includes the subject matter of Example 33, and wherein the first nonvolatile region is different from the second nonvolatile region.

Example 35 includes the subject matter of any of Examples 33 and 34, and further comprising dereferencing, by the computing device, the target address to access a persistent memory data object in response to adding the virtual base address of the persistent memory segment to the offset.

Example 36 includes the subject matter of any of Examples 33-35, and further comprising generating, by the computing device, a runtime representation of the persistent memory pointer in response to indexing the static-to-dynamic table, wherein the runtime representation includes the dynamic region identifier, the segment identifier, and the offset.

Example 37 includes the subject matter of any of Examples 33-36, and further comprising reading, by the computing device, a first entry from a static region identifier table associated with the first nonvolatile region, wherein the static region identifier table is included in the persistent memory, the first entry includes a region name associated with the second nonvolatile region, and an index of the first entry comprises the static region identifier associated with the second nonvolatile region; searching, by the computing device, the open region table for the region name, wherein an index of the region name in the open region table comprises the dynamic region identifier; and indexing, by the computing device, the static-to-dynamic table with the static region identifier to store the dynamic region identifier.

Example 38 includes the subject matter of any of Examples 33-37, and further comprising determining, by the computing device, whether the second nonvolatile region is open in response to searching the open region table; opening, by the computing device, the second nonvolatile region in response to determining that the second region is not open; and adding, by the computing device, a first entry in the open region table in response to opening the second nonvolatile region, wherein the first entry of the open region table includes the region identifier of the second nonvolatile region and an index of the first entry comprises the dynamic region identifier.

Example 39 includes the subject matter of any of Examples 33-38, and further comprising storing, by the computing device, the virtual base address of the region segment table associated with the second nonvolatile region in response to adding the first entry in the open region table.

Example 40 includes the subject matter of any of Examples 33-39, and further comprising reading, by the computing device, a first entry from a segment table associated with the second nonvolatile region, wherein the first entry is associated with the persistent memory segment of the second nonvolatile region, and wherein an index of the first entry comprises the segment identifier; mapping, by the computing device, the persistent memory segment to a virtual memory space of the computing device in response to reading the first entry; and storing, by the computing device, the virtual base address of the first persistent memory segment to the region segment table in response to mapping the persistent memory segment.

Example 41 includes the subject matter of any of Examples 33-40, and further comprising determining, by the computing device, a runtime representation of the persistent memory pointer, wherein the runtime representation includes the dynamic region identifier, the segment identifier, and the offset; indexing, by the computing device, a dynamic-to-static table with the dynamic region identifier to retrieve the static region identifier, wherein the dynamic-to-static table is associated with the first nonvolatile region and is included in the volatile memory; generating, by the computing device, an in-storage representation of the persistent memory pointer, wherein the in-storage representation includes the static region identifier, the segment identifier, and the offset; and storing, by the computing device, the in-storage representation of the persistent memory pointer to the persistent memory.

Example 42 includes the subject matter of any of Examples 33-41, and further comprising determining, by the computing device, whether a static region identifier table associated with the first nonvolatile region includes an entry associated with the second nonvolatile region, wherein the static region identifier table is included in the persistent memory; and adding, by the computing device, a first entry associated with the second nonvolatile region to the static region identifier table in response to determining that the static region identifier table does not include an entry associated with the second nonvolatile region, wherein an index of the first entry comprises the static region identifier associated with the second nonvolatile region.

Example 43 includes the subject matter of any of Examples 33-42, and further comprising updating, by the computing device, the dynamic-to-static table to include the static region identifier associated with the dynamic region identifier in response to adding the first entry to the static region identifier table; and updating, by the computing device, the static-to-dynamic table to include the dynamic region identifier associated with the static region identifier in response to adding the first entry to the static region identifier table.

Example 44 includes a method for persistent-export pointer access, the method comprising loading, by the computing device, an in-storage representation of a persistent-export pointer from a first nonvolatile region of a persistent memory of the computing device, wherein a target address of the persistent-export pointer is within a volatile memory of the computing device and is associated with a persistent-external data object; indexing, by the computing device, a region-external linkable mapping table with the in-storage representation of the persistent-export pointer to retrieve a runtime representation of the persistent-export pointer, wherein the region-external linkable mapping table is associated with the first nonvolatile region and is included in the volatile memory; and indexing, by the computing device, an executable external linkable table with the runtime representation to retrieve the target address associated with the persistent-external data object, wherein the executable external linkable table is associated with an executable process of the computing device and is included in the volatile memory.

Example 45 includes the subject matter of Example 44, and further comprising dereferencing, by the computing device, the target address to access the persistent-external data object in response to indexing the executable external linkable table.

Example 46 includes the subject matter of any of Examples 44 and 45, and wherein the persistent-external data object comprises a function.

Example 47 includes the subject matter of any of Examples 44-46, and further comprising loading, by the computing device, the executable process; mapping, by the computing device, the persistent-external data object to the target address in response to loading the executable process; and updating, by the computing device, the executable external linkable table with the target address in response to mapping the persistent-external data object.

Example 48 includes the subject matter of any of Examples 44-47, and further comprising loading, by the computing device, a first entry from a region-external linkable table associated with the first nonvolatile region, wherein the region-external linkable table is included in the persistent memory, the first entry includes a global identifier associated with the persistent-external data object, and an index of the first entry comprises the in-storage representation of the persistent-export pointer; searching, by the computing device, the executable external linkable table for the global identifier to determine an index associated with the global identifier, wherein the index comprises the runtime representation of the persistent-export pointer; and indexing, by the computing device, the region-external linkable mapping table with the in-storage representation of the persistent-export pointer to store the runtime representation.

Example 49 includes the subject matter of any of Examples 44-48, and further comprising indexing, by the computing device, an executable external linkable mapping table with the runtime representation to retrieve an in-storage representation of the persistent-export pointer, wherein the in-storage representation comprises a value of the persistent-export pointer, and wherein the executable external linkable mapping table is associated with the first nonvolatile region and is included in the volatile memory of the computing device; and storing, by the computing device, the in-storage representation of the persistent-export pointer to the persistent memory.

Example 50 includes the subject matter of any of Examples 44-49, and further comprising determining, by the computing device, whether a region external linkable table associated with the first nonvolatile region includes an entry associated with the persistent-external data object, wherein the region external linkable table is included in the persistent memory; and adding, by the computing device, a first entry to the region external linkable table in response to determining that the region external linkable table does not include an entry associated with the persistent-external data object, wherein an index of the first entry comprises the in-storage representation of the persistent-export pointer.

Example 51 includes the subject matter of any of Examples 44-50, and further comprising updating, by the computing device, the region external linkable mapping table to include the runtime representation associated with the in-storage representation in response to adding the first entry to the region external linkable table; and updating, by the computing device, the executable external linkable mapping table to include the in-storage representation associated with the runtime representation in response to adding the first entry to the region external linkable table.

Example 52 includes a method for compiling code including persistent memory access, the method comprising analyzing, by a computing device, source code including a persistent memory pointer access; and generating, by the computing device in response to analyzing the source code, output code for the persistent memory pointer access, wherein the output code is to cause a target computing device to: load a persistent memory pointer from a first nonvolatile region of a persistent memory of the target computing device, wherein a target address of the persistent memory pointer is in a second nonvolatile region of the persistent memory, and wherein the persistent memory pointer includes a static region identifier associated with the second nonvolatile region, a segment identifier, and an offset; index a static-to-dynamic table with the static region identifier to retrieve a dynamic region identifier associated with the second nonvolatile region, wherein the static-to-dynamic table is associated with the first nonvolatile region and is included in a volatile memory of the target computing device; index an open region table with the dynamic region identifier to retrieve a virtual base address of a region segment table associated with the second nonvolatile region; wherein the open region table and the region segment table are included in the volatile memory; index the region segment table with the segment identifier to retrieve a virtual base address of a persistent memory segment of the second nonvolatile region; and add the virtual base address of the persistent memory segment to the offset to determine the target address of the persistent memory pointer.

Example 53 includes the subject matter of Example 52, and wherein the output code is further to cause the target computing device to dereference the target address to access a persistent memory data object in response to an addition of the virtual base address of the persistent memory segment to the offset.

Example 54 includes the subject matter of any of Examples 52 and 53, and wherein the output code is further to cause the target computing device to generate a runtime representation of the persistent memory pointer in response to an indexing of the static-to-dynamic table, wherein the runtime representation includes the dynamic region identifier, the segment identifier, and the offset.

Example 55 includes the subject matter of any of Examples 52-54, and wherein the output code is further to cause the target computing device to determine a runtime representation of the persistent memory pointer, wherein the runtime representation includes the dynamic region identifier, the segment identifier, and the offset; index a dynamic-to-static table with the dynamic region identifier to retrieve the static region identifier, wherein the dynamic-to-static table is associated with the first nonvolatile region and is included in the volatile memory; generate an in-storage representation of the persistent memory pointer, wherein the in-storage representation includes the static region identifier, the segment identifier, and the offset; and store the in-storage representation of the persistent memory pointer to the persistent memory.

Example 56 includes the subject matter of any of Examples 52-55, and wherein the output code is further to cause the target computing device to determine whether a static region identifier table associated with the first nonvolatile region includes an entry associated with the second nonvolatile region, wherein the static region identifier table is included in the persistent memory; and add a first entry associated with the second nonvolatile region to the static region identifier table in response to a determination that the static region identifier table does not include an entry associated with the second nonvolatile region, wherein an index of the first entry comprises the static region identifier associated with the second nonvolatile region.

Example 57 includes the subject matter of any of Examples 52-56, and wherein the output code is further to cause the target computing device to update the dynamic-to-static table to include the static region identifier associated with the dynamic region identifier in response to an addition of the first entry to the static region identifier table; and update the static-to-dynamic table to include the dynamic region identifier associated with the static region identifier in response to the addition of the first entry to the static region identifier table.

Example 58 includes a method for compiling code including persistent-export pointer access, the method comprising analyzing, by a computing device, source code including a persistent-export pointer access; and generating, by the computing device in response to analyzing the source code, output code for the persistent-export pointer access, wherein the output code is to cause a target computing device to: load an in-storage representation of a persistent-export pointer from a first nonvolatile region of a persistent memory of the target computing device, wherein a target address of the persistent-export pointer is within a volatile memory of the target computing device and is associated with a persistent-external data object; index a region-external linkable mapping table with the in-storage representation of the persistent-export pointer to retrieve a runtime representation of the persistent-export pointer, wherein the region-external linkable mapping table is associated with the first nonvolatile region and is included in the volatile memory; and index an executable external linkable table with the runtime representation to retrieve the target address associated with the persistent-external data object, wherein the executable external linkable table is associated with an executable process of the target computing device and is included in the volatile memory.

Example 59 includes the subject matter of Example 58, and wherein the output code is further to cause the target computing device to dereference the target address to access the persistent-external data object in response to an indexing of the executable external linkable table.

Example 60 includes the subject matter of any of Examples 58 and 59, and wherein the persistent-external data object comprises a function.

Example 61 includes the subject matter of any of Examples 58-60, and further comprising analyzing, by a computing device, source code including a persistent-external data object definition; and generating, by the computing device in response to analyzing the source code, output code including a static executable external linkable table, wherein the static executable external linkable table includes an entry associated with the persistent-external data object definition, wherein the entry includes a global identifier associated with the persistent-external data object.

Example 62 includes the subject matter of any of Examples 58-61, and wherein the output code is further to cause the target computing device to index an executable external mapping table with the runtime representation to retrieve an in-storage representation of the persistent-export pointer, wherein the in-storage representation comprises a value of the persistent-export pointer, and wherein the executable external linkable mapping table is associated with the first nonvolatile region and is included in the volatile memory of the target computing device; and store the in-storage representation of the persistent-export pointer to the persistent memory.

Example 63 includes the subject matter of any of Examples 58-62, and wherein the output code is further to cause the target computing device to determine whether a region external linkable table associated with the first nonvolatile region includes an entry associated with the persistent-external data object, wherein the region external linkable table is included in the persistent memory; and add a first entry to the region external linkable table in response to a determination that the region external linkable table does not include an entry associated with the persistent-external data object, wherein an index of the first entry comprises the in-storage representation of the persistent-export pointer.

Example 64 includes the subject matter of any of Examples 58-63, and wherein the output code is further to cause the target computing device to update the region external linkable mapping table to include the runtime representation associated with the in-storage representation in response to an addition of the first entry to the region external linkable table; and update the executable external linkable mapping table to include the in-storage representation associated with the runtime representation in response to the addition of the first entry to the region external linkable table.

Example 65 includes a computing device comprising a processor; and a memory having stored therein a plurality of instructions that when executed by the processor cause the computing device to perform the method of any of Examples 33-64.

Example 66 includes one or more machine readable storage media comprising a plurality of instructions stored thereon that in response to being executed result in a computing device performing the method of any of Examples 33-64.

Example 67 includes a computing device comprising means for performing the method of any of Examples 33-64.

Example 68 includes a computing device for persistent memory pointer access, the computing device comprising means for loading a persistent memory pointer from a first nonvolatile region of a persistent memory of the computing device, wherein a target address of the persistent memory pointer is in a second nonvolatile region of the persistent memory, and wherein the persistent memory pointer includes a static region identifier associated with the second nonvolatile region, a segment identifier, and an offset; means for indexing a static-to-dynamic table with the static region identifier to retrieve a dynamic region identifier associated with the second nonvolatile region, wherein the static-to-dynamic table is associated with the first nonvolatile region and is included in a volatile memory of the computing device; means for indexing an open region table with the dynamic region identifier to retrieve a virtual base address of a region segment table associated with the second nonvolatile region; wherein the open region table and the region segment table are included in the volatile memory; means for indexing the region segment table with the segment identifier to retrieve a virtual base address of a persistent memory segment of the second nonvolatile region; and means for adding the virtual base address of the persistent memory segment to the offset to determine the target address of the persistent memory pointer.

Example 69 includes the subject matter of Example 68, and wherein the first nonvolatile region is different from the second nonvolatile region.

Example 70 includes the subject matter of any of Examples 68 and 69, and further comprising means for dereferencing the target address to access a persistent memory data object in response to adding the virtual base address of the persistent memory segment to the offset.

Example 71 includes the subject matter of any of Examples 68-70, and further comprising means for generating a runtime representation of the persistent memory pointer in response to indexing the static-to-dynamic table, wherein the runtime representation includes the dynamic region identifier, the segment identifier, and the offset.

Example 72 includes the subject matter of any of Examples 68-71, and further comprising means for reading a first entry from a static region identifier table associated with the first nonvolatile region, wherein the static region identifier table is included in the persistent memory, the first entry includes a region name associated with the second nonvolatile region, and an index of the first entry comprises the static region identifier associated with the second nonvolatile region; means for searching the open region table for the region name, wherein an index of the region name in the open region table comprises the dynamic region identifier; and means for indexing the static-to-dynamic table with the static region identifier to store the dynamic region identifier.

Example 73 includes the subject matter of any of Examples 68-72, and further comprising means for determining whether the second nonvolatile region is open in response to searching the open region table; means for opening the second nonvolatile region in response to determining that the second region is not open; and means for adding a first entry in the open region table in response to opening the second nonvolatile region, wherein the first entry of the open region table includes the region identifier of the second nonvolatile region and an index of the first entry comprises the dynamic region identifier.

Example 74 includes the subject matter of any of Examples 68-73, and further comprising means for storing the virtual base address of the region segment table associated with the second nonvolatile region in response to adding the first entry in the open region table.

Example 75 includes the subject matter of any of Examples 68-74, and further comprising means for reading a first entry from a segment table associated with the second nonvolatile region, wherein the first entry is associated with the persistent memory segment of the second nonvolatile region, and wherein an index of the first entry comprises the segment identifier; means for mapping the persistent memory segment to a virtual memory space of the computing device in response to reading the first entry; and means for storing the virtual base address of the first persistent memory segment to the region segment table in response to mapping the persistent memory segment.

Example 76 includes the subject matter of any of Examples 68-75, and further comprising means for determining a runtime representation of the persistent memory pointer, wherein the runtime representation includes the dynamic region identifier, the segment identifier, and the offset; means for indexing a dynamic-to-static table with the dynamic region identifier to retrieve the static region identifier, wherein the dynamic-to-static table is associated with the first nonvolatile region and is included in the volatile memory; means for generating an in-storage representation of the persistent memory pointer, wherein the in-storage representation includes the static region identifier, the segment identifier, and the offset; and means for storing the in-storage representation of the persistent memory pointer to the persistent memory.

Example 77 includes the subject matter of any of Examples 68-76, and further comprising means for determining whether a static region identifier table associated with the first nonvolatile region includes an entry associated with the second nonvolatile region, wherein the static region identifier table is included in the persistent memory; and means for adding a first entry associated with the second nonvolatile region to the static region identifier table in response to determining that the static region identifier table does not include an entry associated with the second nonvolatile region, wherein an index of the first entry comprises the static region identifier associated with the second nonvolatile region.

Example 78 includes the subject matter of any of Examples 68-77, and further comprising means for updating the dynamic-to-static table to include the static region identifier associated with the dynamic region identifier in response to adding the first entry to the static region identifier table; and means for updating the static-to-dynamic table to include the dynamic region identifier associated with the static region identifier in response to adding the first entry to the static region identifier table.

Example 79 includes a computing device for persistent-export pointer access, the computing device comprising means for loading an in-storage representation of a persistent-export pointer from a first nonvolatile region of a persistent memory of the computing device, wherein a target address of the persistent-export pointer is within a volatile memory of the computing device and is associated with a persistent-external data object; means for indexing a region-external linkable mapping table with the in-storage representation of the persistent-export pointer to retrieve a runtime representation of the persistent-export pointer, wherein the region-external linkable mapping table is associated with the first nonvolatile region and is included in the volatile memory; and means for indexing an executable external linkable table with the runtime representation to retrieve the target address associated with the persistent-external data object, wherein the executable external linkable table is associated with an executable process of the computing device and is included in the volatile memory.

Example 80 includes the subject matter of Example 79, and further comprising means for dereferencing the target address to access the persistent-external data object in response to indexing the executable external linkable table.

Example 81 includes the subject matter of any of Examples 79 and 80, and wherein the persistent-external data object comprises a function.

Example 82 includes the subject matter of any of Examples 79-81, and further comprising means for loading the executable process; means for mapping the persistent-external data object to the target address in response to loading the executable process; and means for updating the executable external linkable table with the target address in response to mapping the persistent-external data object.

Example 83 includes the subject matter of any of Examples 79-82, and further comprising means for loading a first entry from a region-external linkable table associated with the first nonvolatile region, wherein the region-external linkable table is included in the persistent memory, the first entry includes a global identifier associated with the persistent-external data object, and an index of the first entry comprises the in-storage representation of the persistent-export pointer; means for searching the executable external linkable table for the global identifier to determine an index associated with the global identifier, wherein the index comprises the runtime representation of the persistent-export pointer; and means for indexing the region-external linkable mapping table with the in-storage representation of the persistent-export pointer to store the runtime representation.

Example 84 includes the subject matter of any of Examples 79-83, and further comprising means for indexing an executable external linkable mapping table with the runtime representation to retrieve an in-storage representation of the persistent-export pointer, wherein the in-storage representation comprises a value of the persistent-export pointer, and wherein the executable external linkable mapping table is associated with the first nonvolatile region and is included in the volatile memory of the computing device; and means for storing the in-storage representation of the persistent-export pointer to the persistent memory.

Example 85 includes the subject matter of any of Examples 79-84, and further comprising means for determining whether a region external linkable table associated with the first nonvolatile region includes an entry associated with the persistent-external data object, wherein the region external linkable table is included in the persistent memory; and means for adding a first entry to the region external linkable table in response to determining that the region external linkable table does not include an entry associated with the persistent-external data object, wherein an index of the first entry comprises the in-storage representation of the persistent-export pointer.

Example 86 includes the subject matter of any of Examples 79-85, and further comprising means for updating the region external linkable mapping table to include the runtime representation associated with the in-storage representation in response to adding the first entry to the region external linkable table; and means for updating the executable external linkable mapping table to include the in-storage representation associated with the runtime representation in response to adding the first entry to the region external linkable table.

Example 87 includes a computing device for compiling code including persistent memory access, the computing device comprising means for analyzing source code including a persistent memory pointer access; and means for generating, in response to analyzing the source code, output code for the persistent memory pointer access, wherein the output code is to cause a target computing device to: load a persistent memory pointer from a first nonvolatile region of a persistent memory of the target computing device, wherein a target address of the persistent memory pointer is in a second nonvolatile region of the persistent memory, and wherein the persistent memory pointer includes a static region identifier associated with the second nonvolatile region, a segment identifier, and an offset; index a static-to-dynamic table with the static region identifier to retrieve a dynamic region identifier associated with the second nonvolatile region, wherein the static-to-dynamic table is associated with the first nonvolatile region and is included in a volatile memory of the target computing device; index an open region table with the dynamic region identifier to retrieve a virtual base address of a region segment table associated with the second nonvolatile region; wherein the open region table and the region segment table are included in the volatile memory; index the region segment table with the segment identifier to retrieve a virtual base address of a persistent memory segment of the second nonvolatile region; and add the virtual base address of the persistent memory segment to the offset to determine the target address of the persistent memory pointer.

Example 88 includes the subject matter of Example 87, and wherein the output code is further to cause the target computing device to dereference the target address to access a persistent memory data object in response to an addition of the virtual base address of the persistent memory segment to the offset.

Example 89 includes the subject matter of any of Examples 87 and 88, and wherein the output code is further to cause the target computing device to generate a runtime representation of the persistent memory pointer in response to an indexing of the static-to-dynamic table, wherein the runtime representation includes the dynamic region identifier, the segment identifier, and the offset.

Example 90 includes the subject matter of any of Examples 87-89, and wherein the output code is further to cause the target computing device to determine a runtime representation of the persistent memory pointer, wherein the runtime representation includes the dynamic region identifier, the segment identifier, and the offset; index a dynamic-to-static table with the dynamic region identifier to retrieve the static region identifier, wherein the dynamic-to-static table is associated with the first nonvolatile region and is included in the volatile memory; generate an in-storage representation of the persistent memory pointer, wherein the in-storage representation includes the static region identifier, the segment identifier, and the offset; and store the in-storage representation of the persistent memory pointer to the persistent memory.

Example 91 includes the subject matter of any of Examples 87-90, and wherein the output code is further to cause the target computing device to determine whether a static region identifier table associated with the first nonvolatile region includes an entry associated with the second nonvolatile region, wherein the static region identifier table is included in the persistent memory; and add a first entry associated with the second nonvolatile region to the static region identifier table in response to a determination that the static region identifier table does not include an entry associated with the second nonvolatile region, wherein an index of the first entry comprises the static region identifier associated with the second nonvolatile region.

Example 92 includes the subject matter of any of Examples 87-91, and wherein the output code is further to cause the target computing device to update the dynamic-to-static table to include the static region identifier associated with the dynamic region identifier in response to an addition of the first entry to the static region identifier table; and update the static-to-dynamic table to include the dynamic region identifier associated with the static region identifier in response to the addition of the first entry to the static region identifier table.

Example 93 includes a computing device for compiling code including persistent-export pointer access, the computing device comprising means for analyzing source code including a persistent-export pointer access; and means for generating, in response to analyzing the source code, output code for the persistent-export pointer access, wherein the output code is to cause a target computing device to: load an in-storage representation of a persistent-export pointer from a first nonvolatile region of a persistent memory of the target computing device, wherein a target address of the persistent-export pointer is within a volatile memory of the target computing device and is associated with a persistent-external data object; index a region-external linkable mapping table with the in-storage representation of the persistent-export pointer to retrieve a runtime representation of the persistent-export pointer, wherein the region-external linkable mapping table is associated with the first nonvolatile region and is included in the volatile memory; and index an executable external linkable table with the runtime representation to retrieve the target address associated with the persistent-external data object, wherein the executable external linkable table is associated with an executable process of the target computing device and is included in the volatile memory.

Example 94 includes the subject matter of Example 93, and wherein the output code is further to cause the target computing device to dereference the target address to access the persistent-external data object in response to an indexing of the executable external linkable table.

Example 95 includes the subject matter of any of Examples 93 and 94, and wherein the persistent-external data object comprises a function.

Example 96 includes the subject matter of any of Examples 93-95, and further comprising means for analyzing source code including a persistent-external data object definition; and means for generating, in response to analyzing the source code, output code including a static executable external linkable table, wherein the static executable external linkable table includes an entry associated with the persistent-external data object definition, wherein the entry includes a global identifier associated with the persistent-external data object.

Example 97 includes the subject matter of any of Examples 93-96, and wherein the output code is further to cause the target computing device to index an executable external linkable mapping table with the runtime representation to retrieve an in-storage representation of the persistent-export pointer, wherein the in-storage representation comprises a value of the persistent-export pointer, and wherein the executable external linkable mapping table is associated with the first nonvolatile region and is included in the volatile memory of the target computing device; and store the in-storage representation of the persistent-export pointer to the persistent memory.

Example 98 includes the subject matter of any of Examples 93-97, and wherein the output code is further to cause the target computing device to determine whether a region external linkable table associated with the first nonvolatile region includes an entry associated with the persistent-external data object, wherein the region external linkable table is included in the persistent memory; and add a first entry to the region external linkable table in response to a determination that the region external linkable table does not include an entry associated with the persistent-external data object, wherein an index of the first entry comprises the in-storage representation of the persistent-export pointer.

Example 99 includes the subject matter of any of Examples 93-98, and wherein the output code is further to cause the target computing device to update the region external linkable mapping table to include the runtime representation associated with the in-storage representation in response to an addition of the first entry to the region external linkable table; and update the executable external linkable mapping table to include the in-storage representation associated with the runtime representation in response to the addition of the first entry to the region external linkable table.

The invention claimed is:

1. A computing device for persistent-export pointer access, the computing device comprising:
   a persistent memory, wherein the persistent memory includes a first nonvolatile region;
   a volatile memory; and
   a persistent-export pointer access module to:
      load an in-storage representation of a persistent-export pointer from the first nonvolatile region, wherein a target address of the persistent-export pointer is within the volatile memory and is associated with a persistent-external data object;
      index a region-external linkable mapping table with the in-storage representation of the persistent-export pointer to retrieve a runtime representation of the persistent-export pointer, wherein the region-external linkable mapping table is associated with the first nonvolatile region and is included in the volatile memory; and
      index an executable external linkable table with the runtime representation to retrieve the target address associated with the persistent-external data object, wherein the executable external linkable table is associated with an executable process of the computing device and is included in the volatile memory.

2. The computing device of claim 1, wherein the persistent-export pointer access module is further to dereference the target address to access the persistent-external data object in response to an indexing of the executable external linkable table.

3. The computing device of claim 1, wherein the persistent-external data object comprises a function.

4. The computing device of claim 1, further comprising a dynamic loader module to:
   load the executable process;
   map the persistent-external data object to the target address in response to a loading of the executable process; and
   update the executable external linkable table with the target address in response to a mapping of the persistent-external data object.

5. The computing device of claim 1, further comprising a non-volatile region metadata processing module to:
  load a first entry from a region-external linkable table associated with the first nonvolatile region, wherein the region-external linkable table is included in the persistent memory, the first entry includes a global identifier associated with the persistent-external data object, and an index of the first entry comprises the in-storage representation of the persistent-export pointer;
  search the executable external linkable table for the global identifier to determine an index associated with the global identifier, wherein the index comprises the runtime representation of the persistent-export pointer; and
  index the region-external linkable mapping table with the in-storage representation of the persistent-export pointer to store the runtime representation.

6. The computing device of claim 1, wherein the persistent-export pointer access module is further to:
  index an executable external linkable mapping table with the runtime representation to retrieve an in-storage representation of the persistent-export pointer, wherein the in-storage representation comprises a value of the persistent-export pointer, and wherein the executable external linkable mapping table is associated with the first nonvolatile region and is included in the volatile memory of the computing device; and
  store the in-storage representation of the persistent-export pointer to the persistent memory.

7. The computing device of claim 6, further comprising a non-volatile region metadata processing module to:
  determine whether a region external linkable table associated with the first nonvolatile region includes an entry associated with the persistent-external data object, wherein the region external linkable table is included in the persistent memory; and
  add a first entry to the region external linkable table in response to a determination that the region external linkable table does not include an entry associated with the persistent-external data object, wherein an index of the first entry comprises the in-storage representation of the persistent-export pointer.

8. The computing device of claim 7, wherein the non-volatile region metadata processing module is further to:
  update the region external linkable mapping table to include the runtime representation associated with the in-storage representation in response to an addition of the first entry to the region external linkable table; and
  update the executable external linkable mapping table to include the in-storage representation associated with the runtime representation in response to the addition of the first entry to the region external linkable table.

9. A method for persistent-export pointer access, the method comprising:
  loading, by the computing device, an in-storage representation of a persistent-export pointer from a first nonvolatile region of a persistent memory of the computing device, wherein a target address of the persistent-export pointer is within a volatile memory of the computing device and is associated with a persistent-external data object;
  indexing, by the computing device, a region-external linkable mapping table with the in-storage representation of the persistent-export pointer to retrieve a runtime representation of the persistent-export pointer, wherein the region-external linkable mapping table is associated with the first nonvolatile region and is included in the volatile memory; and
  indexing, by the computing device, an executable external linkable table with the runtime representation to retrieve the target address associated with the persistent-external data object, wherein the executable external linkable table is associated with an executable process of the computing device and is included in the volatile memory.

10. The method of claim 9, further comprising dereferencing, by the computing device, the target address to access the persistent-external data object in response to indexing the executable external linkable table.

11. The method of claim 9, wherein the persistent-external data object comprises a function.

12. The method of claim 9, further comprising:
  loading, by the computing device, the executable process;
  mapping, by the computing device, the persistent-external data object to the target address in response to loading the executable process; and
  updating, by the computing device, the executable external linkable table with the target address in response to mapping the persistent-external data object.

13. The method of claim 9, further comprising:
  loading, by the computing device, a first entry from a region-external linkable table associated with the first nonvolatile region, wherein the region-external linkable table is included in the persistent memory, the first entry includes a global identifier associated with the persistent-external data object, and an index of the first entry comprises the in-storage representation of the persistent-export pointer;
  searching, by the computing device, the executable external linkable table for the global identifier to determine an index associated with the global identifier, wherein the index comprises the runtime representation of the persistent-export pointer; and
  indexing, by the computing device, the region-external linkable mapping table with the in-storage representation of the persistent-export pointer to store the runtime representation.

14. The method of claim 9, further comprising:
  indexing, by the computing device, an executable external linkable mapping table with the runtime representation to retrieve an in-storage representation of the persistent-export pointer, wherein the in-storage representation comprises a value of the persistent-export pointer, and wherein the executable external linkable mapping table is associated with the first nonvolatile region and is included in the volatile memory of the computing device; and
  storing, by the computing device, the in-storage representation of the persistent-export pointer to the persistent memory.

15. One or more computer-readable storage media comprising a plurality of instructions that in response to being executed cause a computing device to:
  load an in-storage representation of a persistent-export pointer from a first nonvolatile region of a persistent memory of the computing device, wherein a target address of the persistent-export pointer is within a volatile memory of the computing device and is associated with a persistent-external data object;
  index a region-external linkable mapping table with the in-storage representation of the persistent-export pointer to retrieve a runtime representation of the persistent-export pointer, wherein the region-external linkable mapping table is associated with the first nonvolatile region and is included in the volatile memory; and index an executable external linkable table with the runtime representation to retrieve the target address associated with the persistent-external data object, wherein the executable external linkable table is associated with an executable process of the computing device and is included in the volatile memory.

16. The one or more computer-readable storage media of claim 15, further comprising a plurality of instructions that in response to being executed cause the computing device to dereference the target address to access the persistent-external data object in response to indexing the executable external linkable table.

17. The one or more computer-readable storage media of claim 15, wherein the persistent-external data object comprises a function.

18. The one or more computer-readable storage media of claim 15, further comprising a plurality of instructions that in response to being executed cause the computing device to:

load the executable process;

map the persistent-external data object to the target address in response to loading the executable process; and update the executable external linkable table with the target address in response to mapping the persistent-external data object.

19. The one or more computer-readable storage media of claim 15, further comprising a plurality of instructions that in response to being executed cause the computing device to:

load a first entry from a region-external linkable table associated with the first nonvolatile region, wherein the region-external linkable table is included in the persistent memory, the first entry includes a global identifier associated with the persistent-external data object, and an index of the first entry comprises the in-storage representation of the persistent-export pointer;

search the executable external linkable table for the global identifier to determine an index associated with the global identifier, wherein the index comprises the runtime representation of the persistent-export pointer; and index the region-external linkable mapping table with the in-storage representation of the persistent-export pointer to store the runtime representation.

20. The one or more computer-readable storage media of claim 15, further comprising a plurality of instructions that in response to being executed cause the computing device to:

index an executable external linkable mapping table with the runtime representation to retrieve an in-storage representation of the persistent-export pointer, wherein the in-storage representation comprises a value of the persistent-export pointer, and wherein the executable external linkable mapping table is associated with the first nonvolatile region and is included in the volatile memory of the computing device; and store the in-storage representation of the persistent-export pointer to the persistent memory.

* * * * *